(12) United States Patent
Purvis, II et al.

(10) Patent No.: US 12,481,099 B2
(45) Date of Patent: Nov. 25, 2025

(54) ACTIVE MODULATION OF THE REFRACTIVE INDEX IN PHOTONIC INTEGRATED CIRCUITS VIA CHARGE INJECTION

(71) Applicant: Meta Platforms Technologies, LLC, Menlo Park, CA (US)

(72) Inventors: Lafe Joseph Purvis, II, Redmond, WA (US); Tingling Rao, Bellevue, WA (US); Andrew John Ouderkirk, Kirkland, WA (US); Arman Boromand, Issaquah, WA (US); Kimberly Kay Childress, Duvall, WA (US); Ehsan Vadiee, Bothell, WA (US); Namseok Park, Issaquah, WA (US); Poer Sung, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 457 days.

(21) Appl. No.: 18/056,590

(22) Filed: Nov. 17, 2022

(65) Prior Publication Data
US 2023/0194785 A1 Jun. 22, 2023

Related U.S. Application Data

(60) Provisional application No. 63/291,057, filed on Dec. 17, 2021.

(51) Int. Cl.
*G02B 6/122* (2006.01)
*G02B 6/126* (2006.01)
*G02B 6/132* (2006.01)
*G02B 6/12* (2006.01)

(52) U.S. Cl.
CPC ........... *G02B 6/1223* (2013.01); *G02B 6/126* (2013.01); *G02B 6/132* (2013.01); *G02B 2006/12069* (2013.01)

(58) Field of Classification Search
CPC .... G02B 6/122; G02B 6/1221; G02B 6/1223; G02B 6/126; G02B 2006/12035; G02B 2006/12069
USPC .................. 385/1–3, 8, 9, 14, 130, 131, 132
See application file for complete search history.

(56) References Cited

U.S. PATENT DOCUMENTS

| | | | | |
|---|---|---|---|---|
| 4,624,756 A * | 11/1986 | Matsuda | .................. | C30B 29/54 205/433 |
| 5,385,116 A * | 1/1995 | Hattori | .................... | C30B 29/58 117/5 |
| 6,406,647 B1 * | 6/2002 | Thakur | .................... | C30B 29/54 252/582 |

(Continued)

OTHER PUBLICATIONS

"Fabrication and optical properties of organic crystal waveguide" by Kaino et al., Proceedings of SPIE vol. 4106, pp. 74-85 (Year: 2000).*

(Continued)

*Primary Examiner* — Robert Tavlykaev
(74) *Attorney, Agent, or Firm* — Greenberg Traurig, LLP

(57) ABSTRACT

A photonic integrated circuit (PIC) includes an organic solid crystal (OSC) material layer, the OSC material layer having a substrate portion and a raised optical element integral with and extending from the substrate portion. The raised optical element may include a passive or active component of the photonic integrated circuit.

18 Claims, 18 Drawing Sheets

A

B

(56) References Cited

U.S. PATENT DOCUMENTS

| | | | |
|---|---|---|---|
| 6,608,205 B1* | 8/2003 | Leyderman | C30B 11/00 585/24 |
| 2017/0315274 A1* | 11/2017 | Park | G02B 27/646 |
| 2021/0231943 A1* | 7/2021 | Bellman | G02B 3/14 |

OTHER PUBLICATIONS

"Organic Electro-Optic Crystal Modulators" by Jazbinsek et al., in "Broadband Optical Modulators: Science, Technology, and Applications", pp. 281-306 (Year: 2011).*
"Waveguide combiners for mixed reality headsets: a nanophotonics design perspective" by Kress et al., Nanophotonics; vol. 10, No. 1, pp. 41-74 (Year: 2020).*
"Electro-optic single-crystalline organic waveguides and nanowires grown from the melt" by Figi et al., Optics Express, vol. 16, No. 15, pp. 11310-11327 (Year: 2008).*
International Preliminary Report on Patentability for International Application No. PCT/US2022/052827, mailed Jun. 27, 2024, 9 pages.

* cited by examiner

A

B

*A*

*B*

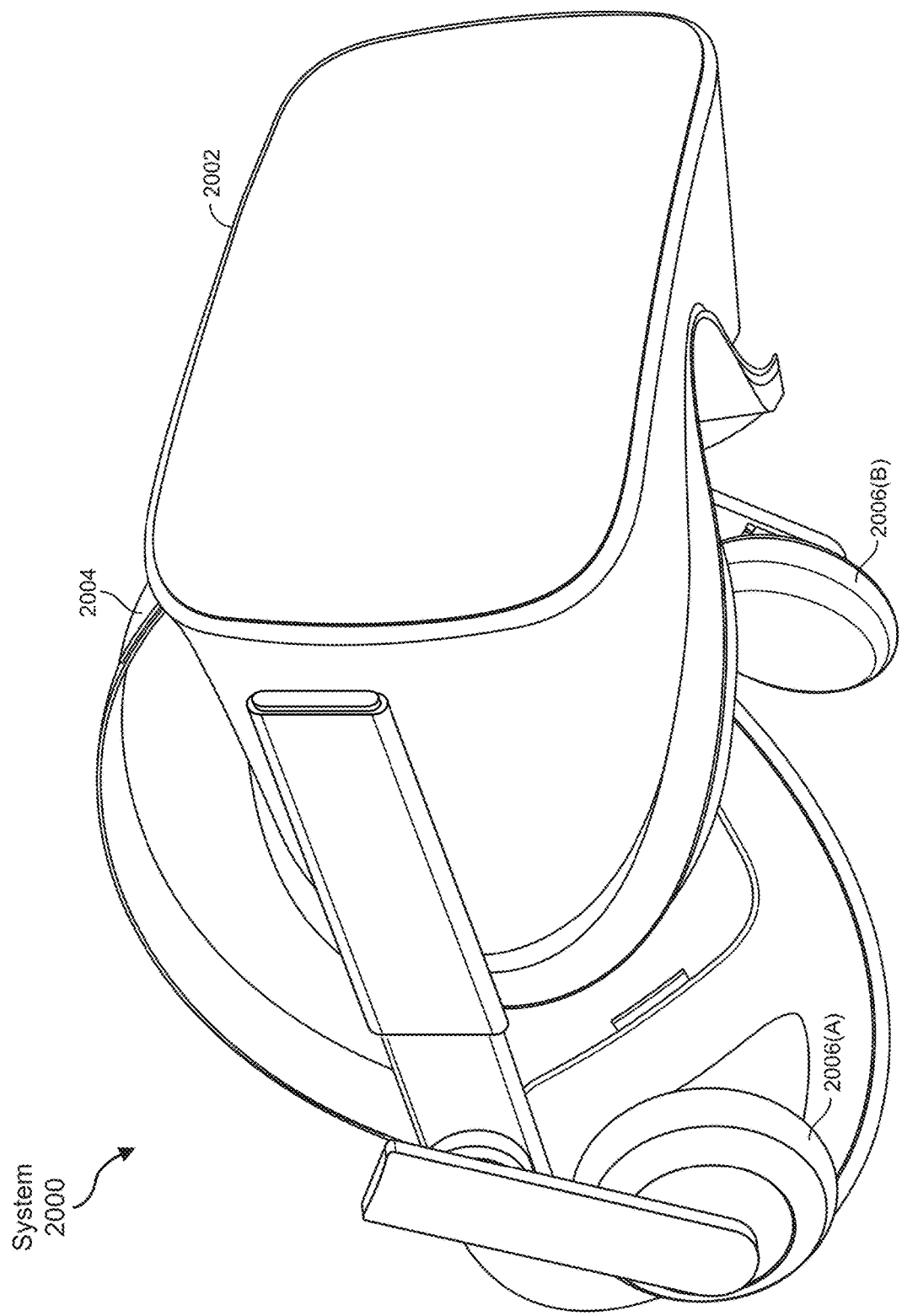

ACTIVE MODULATION OF THE REFRACTIVE INDEX IN PHOTONIC INTEGRATED CIRCUITS VIA CHARGE INJECTION

CROSS-REFERENCE TO RELATED APPLICATION

This application claims the benefit of priority under 35 U.S.C. § 119(e) of U.S. Provisional Application No. 63/291,057, filed Dec. 17, 2021, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 20 is an illustration of an exemplary virtual-reality headset that may be used in connection with embodiments of this disclosure.

Figure 1:
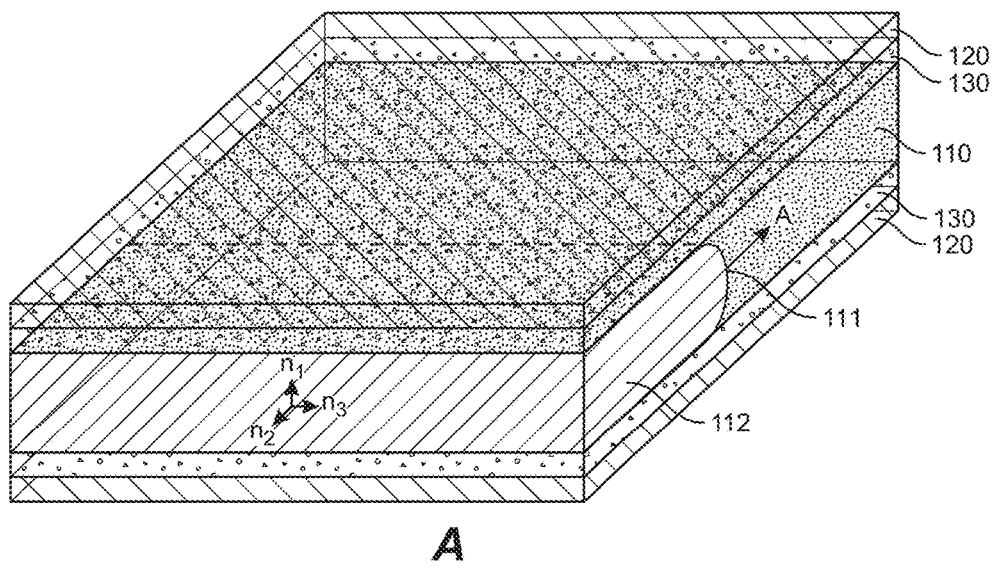
FIG. 1 illustrates example methods for manufacturing (A) a free-standing organic solid crystal material and (B) a supported organic solid crystal material according to various embodiments.
Figure 1:
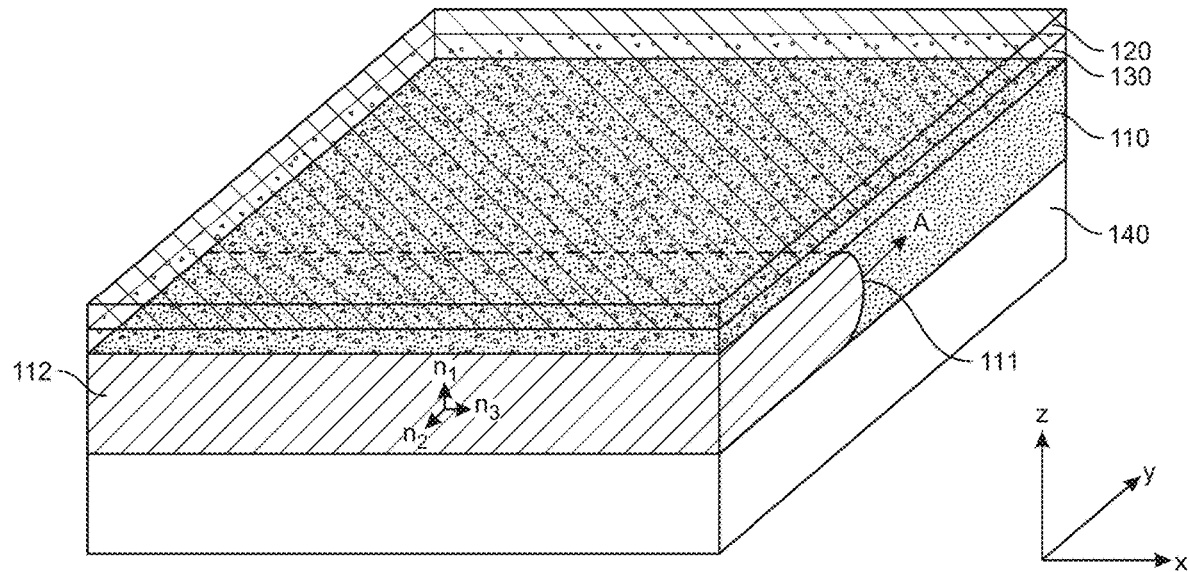

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is related generally to the active modulation of the refractive index in organic materials via charge injection. Applicants have shown that through the application of an electric current and/or voltage, the refractive index of various organic compositions can be tuned to a commercially relevant degree in a highly controlled fashion. The disclosed organic materials may include various classes of organic semiconductors and may be incorporated into a variety of optical systems and devices.

In contrast to optical materials that may have either a static index of refraction or an index that can be switched only between two static states, organic solid crystal materials represent a class of optical materials where the index of refraction can be tuned over a range of values to advantageously control the interaction of these materials with light.

Organic materials may be incorporated into a variety of different optic and/or electro-optic device architectures, including active or passive optics and/or electroactive devices. Due to their light weight and conformability, one or more organic layers may be incorporated into wearable devices such as smart glasses. Such organic layers may be attractive candidates for emerging technologies like virtual and/or augmented reality devices where a comfortable, adjustable form factor is desired.

In some examples, virtual reality (VR) and augmented reality (AR) eyewear devices or headsets may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or AR overlay. VR/AR eyewear devices and headsets may be used for a variety of purposes. For example, governments may use such devices for military training, medical professionals may use such devices to simulate surgery, and/or engineers may use such devices as design visualization aids.

These and other applications may leverage one or more characteristics of optically anisotropic organic materials to manipulate light. Notwithstanding recent developments, for use in such devices and systems, it would be advantageous to provide organic or other dielectric materials to achieve improved optical and mechanical properties.

As disclosed herein, a class of optically anisotropic organic materials may be incorporated into a variety of photonic integrated circuits (PICs) and corresponding components, including lenses, gratings, filters, waveguides, crossing structures, tapers, directional couplers, and/or beam splitters. In certain embodiments, PICs may be coupled to and/or disposed on an optical element located within the transparent aperture of an optical device such as a lens. By way of example, such an optical element may be incorporated into tunable lenses, accommodative optical elements, adaptive optics, VR/AR eyewear devices, and/or OHMDs.

In some examples, PICs may be configured to integrate two or more photonic functions that carry information signals imposed on optical wavelengths typically in the visible and near infrared spectrums. PICs may include and/or represent passive and/or active components that form an integrated electro-optical-mechanical system.

In some examples, a passive component of a PIC may include and/or represent a core layer and a cladding layer. In such examples, the cladding layer may be disposed over the core layer, and the refractive index of the core layer may be greater than the refractive index of the cladding layer. Although inorganic materials (such as inorganic thin film crystals and/or inorganic amorphous thin films) and/or organic polymers may be used to form passive components in PICs, such inorganic materials and/or organic polymers may be unable to provide and/or achieve various advantages and/or features offered by optically anisotropic organic materials.

For example, some inorganic materials and/or organic polymers may be unable to provide a birefringence and/or a refractive index as high as optically anisotropic organic materials. As a result, such inorganic materials and/or organic polymers may perform poorer than optically anisotropic organic materials as PICs in certain optical systems, devices, and/or implementations. As another example, some inorganic materials and/or organic polymers may be rigid, brittle, and/or inflexible (especially compared to optically anisotropic organic materials). As a result, such inorganic materials and/or organic polymers may be unable to contour, be shaped to, and/or be disposed on, along, and/or across nonplanar surfaces, such as those incorporated in concave lenses, convex lenses, and/or Fresnel lenses.

In some examples, the optical and mechanical properties of optically anisotropic organic materials may provide a number of advantages for their application in PICs, including mechanical stability under applied loads, thermal stability, mechanical flexibility and fewer realized defects as a result of induced strains, and higher refractive indices than many comparative inorganic and/or polymer materials. These advantages may also include and/or lead to higher operational efficiencies and/or longer lifetimes.

In accordance with various embodiments, an optically anisotropic organic material may be incorporated into a passive or active component of a photonic integrated circuit. The optically anisotropic organic material may include uniaxially oriented or biaxially oriented crystallites or glasses. In some embodiments, optically anisotropic organic materials may include and/or represent a preferred molecular packing, orientation, and/or alignment of molecules to achieve certain characteristics and/or attributes. The optically anisotropic organic materials may include and/or represent crystalline (e.g., a single crystal), partially crystalline, and/or amorphous materials (e.g., anisotropic glasses).

Further to the foregoing, the present disclosure is generally directed to apparatuses, systems, and methods for disposing photonic integrated circuits (PICs) on planar or nonplanar surfaces. As will be explained in greater detail below, these apparatuses, systems, and methods may provide numerous features and benefits.

As will be explained in greater detail herein, embodiments of the instant disclosure relate to switchable optical elements that include an organic solid crystal (OSC) material layer. The OSC layer may exhibit a first refractive index in a first biased state and a second refractive index in a second biased state, and may be actively tuned across a range of refractive index values between the first refractive index and the second refractive index.

In some examples, the optically anisotropic organic material may be characterized by a uniaxially-oriented or biaxially-oriented index of refraction. In one example, a maximum refractive index of the optically anisotropic material may reach at least approximately 1.6, at least 1.8, at least 2.0, and/or at least 2.2. In certain applications, the performance of the PIC may increase as the refractive index of the optically anisotropic organic material increases. In other words, the higher the refractive index of the optically anisotropic organic material, the better the PIC may perform.

In one example, a birefringence of the optically anisotropic material may reach at least approximately 0.01, at least 0.02, at least 0.05, at least 0.1, and/or at least 0.2. In certain applications, the performance of the PIC may increase as the birefringence of the optically anisotropic organic material increases. In other words, the higher the birefringence of the optically anisotropic organic material, the better the PIC may perform.

In some examples, the optically anisotropic organic material may provide polymer and other organic solid materials that promote improved optical properties, such as a controllable refractive index and/or birefringence, optical clarity, and/or optical transparency. In one example, the optically anisotropic organic material may be formed as and/or incorporated into a thin film. In addition, a plurality of such thin films may be stacked together to form a multilayer thin film.

In some examples, a multilayer thin film may include and/or represent a plurality of organic solid crystal layers. In one example, this multilayer thin film may include and/or represent a part and/or component of an optical device and/or system. By way of example, a lens system with a circular reflective polarizer may include and/or incorporate a multilayer organic solid thin film. In this example, the multilayer thin film may include and/or represent a plurality of biaxially oriented organic solid material layers. Each biaxial layer may be characterized by three mutually orthogonal refractive indices ($n_1$, $n_2$, $n_3$) where $n_1 \neq n_2 \neq n_3$.

According to certain embodiments, a multilayer organic solid thin film may be incorporated into a circular reflective polarizer for use in display systems to provide high broadband efficiency and/or high off-axis contrast. By misaligning and/or rotating each layer with respect to an adjacent layer, such biaxially oriented multilayer thin films may facilitate higher signal efficiency and/or greater ghost image suppression than architectures using comparative inorganic materials. In addition, organic solid thin films may be implemented in various projectors to enhance and/or improve brightness.

In accordance with various embodiments, organic semiconductors may include small molecules, macromolecules, liquid crystals, organometallic compounds, oligomers, and polymers. Organic semiconductors may include p-type, n-type, or ambipolar polycyclic aromatic hydrocarbons, including acenes such as naphthalene, anthracene, phenanthrene, pyrene, corannulene, fluorene, biphenyl, etc. Example compounds may include cyclic, linear and/or branched structures, which may be saturated or unsaturated, and may additionally include heteroatoms and saturated or unsaturated heterocycles, such as furan, pyrrole, thiophene, pyridine, pyrimidine, piperidine, triazenes, thiazole, oxazoles, oxathioles, and the like. Heteroatoms (i.e., dopants) may include ambipolar organic semiconductors, fluorine, chlorine, nitrogen, oxygen, sulfur, selenium, tellurium, phosphorus, as well as various metals, such as silver, copper, potassium, and sodium. Further example small molecules include fullerenes, such as carbon 60.

According to further examples, an OSC material layer may include one or more hydrocarbons such as strait and/or branched alkanes, alkenes, alkynes, cyclic hydrocarbons, e.g., cyclopentane, cyclooctane, adamantane, and linear or cyclic unsaturated hydrocarbons, e.g., cyclobutadiene, cyclooctadiene, isoprene, and hexadiyne. An OSC material layer may include a functional group. Example functional groups include fluorine, chlorine, nitrogen, oxygen, sulfur, selenium, tellurium, phosphorus, alkanes, alkenes, alkynes, esters, ethers, aldehydes, ketones, alcohols, ether, and carboxylic acids.

Structurally, the disclosed organic materials may be glassy, polycrystalline, or single crystal. Organic solid crystals, for instance, may include closely packed structures (e.g., organic molecules) that exhibit desirable optical properties such as a high and tunable refractive index, and high birefringence. Such materials may provide functionalities, including phase modulation, beam steering, wave-front shaping and correction, optical communication, optical computation, holography, and the like. Due to their optical and mechanical properties, organic solid crystals may enable high-performance devices, and may be incorporated into passive or active optics, including AR/VR headsets, and may replace comparative material systems such as polymers, inorganic materials, and liquid crystals. In certain aspects, organic solid crystals may have optical properties that rival those of inorganic crystals while exhibiting the processability and electrical response of liquid crystals.

According to some embodiments, one or more organic material layers may be used to form a variety of devices, including transistors, diodes, capacitors, etc. Example transistor architectures include MOSFET, JFET, ESFET, HEMT, BJT, etc. In certain embodiments, a transistor architecture may include an organic field effect transistor (OFET), which may have a geometry selected from TGTC, BGTC, TGBC, and BGBC. Example diodes may include p-n junction, Schottky, avalanche, and PIN geometries. Example capacitors may include a parallel plate geometry. In a multilayer architecture, the composition, structure, and properties of each organic layer may be independently selected.

Due to their relatively low melting temperature, organic solid crystals may be molded to form a desired structure. Molding processes may enable complex architectures and may be more economical than the cutting, grinding, and polishing of bulk crystals. In addition, as disclosed further herein, a chemical additive may be integrated with a molding process to improve the surface roughness of a molded organic solid crystal in situ. In one example, a single crystal or polycrystalline basic shape such as a sheet or cube may be partially or fully melted into a desired form and then controllably cooled to form a single crystal having an equivalent or different shape. Suitable feedstock for molding solid organic semiconductor materials may include neat organic compositions, solutions, dispersions, or suspensions.

High refractive index and highly birefringent organic semiconductor materials may be manufactured as a freestanding article or as a thin film deposited onto a substrate. An epitaxial or non-epitaxial growth process, for example, may be used to form an organic solid crystal (OSC) layer over a suitable substrate or mold. A seed layer for encouraging crystal nucleation and an anti-nucleation layer configured to locally inhibit nucleation may collectively promote the formation of a limited number of crystal nuclei within specified locations, which may in turn encourage the formation of larger organic solid crystals. An anti-nucleation layer may include a dielectric material. In further embodiments, an anti-nucleation layer may include an amorphous material. In example processes, crystal nucleation may occur independent of the substrate or mold.

The substrate or mold may include any suitable material, e.g., silicon, silicon dioxide, fused silica, quartz, glass, nickel, silicone, siloxanes, perfluoropolyethers, polytetrafluoroethylenes, perfluoroalkoxy alkanes, polyimide, polyethylene naphthalate, polyvinylidene fluoride, polyphenylene sulfide, and the like. For the sake of convenience, the terms "substrate" and "mold" may be used interchangeably herein unless the context indicates otherwise.

In some embodiments, a surface treatment or a release layer disposed over the substrate or mold may be used to control nucleation and growth of the organic solid crystal (OSC) and later promote separation and harvesting of a bulk crystal or thin film. For instance, a coating having a solubility parameter mismatch with the deposition chemistry may be applied to the substrate (e.g., locally) to suppress interaction between the substrate and the crystallizing layer during the deposition process. Examples of such coatings include oleophobic coatings or hydrophobic coatings. A thin layer, e.g., monolayer or bilayer, of an oleophobic material or a hydrophobic material may be used to condition the substrate or mold prior to an epitaxial process. The coating material may be selected based on the substrate and/or the crystalline material. Further example coating materials include siloxanes, fluorosiloxanes, phenyl siloxanes, fluorinated coatings, polyvinyl alcohol, and other OH bearing coatings, acrylics, polyurethanes, polyesters, polyimides, and the like.

A buffer layer may be formed over the deposition surface of a substrate or mold. A buffer layer may include a small molecule that is similar to or even equivalent to the small molecule making up the organic solid crystal, e.g., an anthracene single crystal. A buffer layer may be used to tune one or more properties of the growth surface of the substrate or mold, including surface energy, wettability, crystalline or molecular orientation, etc.

In lieu of, or in addition to, molding, thin film solid organic materials may be manufactured using one or more processes selected from chemical vapor deposition, physical vapor deposition, ink jet deposition, spin-coating, blade coating, thermal annealing, zone annealing, and roll-to-roll processing.

An organic thin film may include a surface that is planar, convex, or concave. In some embodiments, the surface may include a three-dimensional architecture, such as a periodic surface relief grating. In further embodiments, a thin film may be configured as a microlens or a prismatic lens. For instance, polarization optics may include a microlens that selectively focuses one polarization of light over another. In some embodiments, a structured surface may be formed in situ, i.e., during crystal growth of the organic solid crystal. In further embodiments, a structured surface may be formed after crystal growth, e.g., using additive or subtractive processing, such as photolithography and etching.

A thin film or bulk crystal of an organic semiconductor may be free-standing or disposed over a substrate. A substrate, if used, may be rigid or deformable. The nucleation and growth kinetics and choice of chemistry may be selected to produce a solid organic crystal thin film having areal (lateral) dimensions of at least approximately 1 cm. In a further example, an organic solid crystal fiber may have a length (axial) dimension of at least approximately 1 cm.

The organic crystalline phase may be single crystal or polycrystalline. In some embodiments, the organic crystalline phase may include amorphous regions. In some embodiments, the organic crystalline phase may be substantially crystalline. The organic crystalline phase may be characterized by a refractive index along at least one principal axis of at least approximately 1.4 at 589 nm and may be isotropic or anisotropic. By way of example, the refractive index of an organic crystalline phase at 589 nm and along at least one principal axis may be at least approximately 1.5, at least approximately 1.6, at least approximately 1.7, at least approximately 1.8, at least approximately 1.9, at least approximately 2.0, at least approximately 2.1, at least approximately 2.2, at least approximately 2.3, at least approximately 2.4, at least approximately 2.5, or at least approximately 2.6, including ranges between any of the foregoing values.

In some embodiments, the organic crystalline phase may be birefringent, where $n_1 \neq n_2 \neq n_3$, or $n_1 \neq n_2 = n_3$, or $n_1 = n_2 \neq n_3$, and may be characterized by a birefringence ($\Delta n$) of at least approximately 0.01, e.g., at least approximately 0.01, at least approximately 0.02, at least approximately 0.05, at least approximately 0.1, at least approximately 0.2, at least approximately 0.3, at least approximately 0.4, or at least approximately 0.5, including ranges between any of the foregoing values. In some embodiments, a birefringent organic crystalline phase may be characterized by a birefringence of less than approximately 0.1, e.g., less than approximately 0.1, less than approximately 0.05, less than approximately 0.02, less than approximately 0.01, less than approximately 0.005, less than approximately 0.002, or less than approximately 0.001, including ranges between any of the foregoing values.

Three axis ellipsometry data for example isotropic or anisotropic organic molecules are shown in Table 1. The data include predicted and measured refractive index values and birefringence values for 1,2,3-trichlorobenzene (1,2,3-TCB), 1,2-diphenylethyne (1,2-DPE), and phenazine. Shown are larger than anticipated refractive index values and birefringence compared to calculated values based on the HOMO-LUMO gap for each composition.

TABLE 1

Index and Birefringence Data for Example Organic Semiconductors

| OSC Material | Predicted Index | Measured Index (589 nm) | | | Birefringence | | |
| --- | --- | --- | --- | --- | --- | --- | --- |
| | | nx | ny | nz | $\Delta n(xy)$ | $\Delta n(xz)$ | $\Delta n(yz)$ |
| 1,2,3-TCB | 1.567 | 1.67 | 1.76 | 1.85 | 0.09 | 0.18 | 0.09 |
| 1,2-DPE | 1.623 | 1.62 | 1.83 | 1.63 | 0.18 | 0.01 | 0.17 |
| phenazine | 1.74 | 1.76 | 1.84 | 1.97 | 0.08 | 0.21 | 0.13 |

According to particular embodiments, a method of forming an organic solid crystal (OSC) may include contacting an organic precursor with a non-volatile medium material, forming a layer including the organic precursor over a surface of a substrate or mold, and processing the organic precursor to form an organic crystalline phase, where the organic crystalline phase includes a preferred orientation of molecules.

The act of contacting the organic precursor with the non-volatile medium material may include forming a homogeneous mixture of the organic precursor and the non-volatile medium material. In further embodiments, the act of contacting the organic precursor with the non-volatile medium material may include forming a layer of the non-volatile medium material over a surface of a substrate or mold and forming a layer of the organic precursor over the layer of the non-volatile medium material.

The substrate or mold may include a surface that is configured to provide a desired shape and form factor to the molded organic article. For example, the substrate or mold surface may be planar, concave, or convex, and may include a three-dimensional architecture, such as surface relief gratings, or a curvature configured to form microlenses, microprisms, or prismatic lenses. That is, according to some embodiments, a substrate or mold geometry may be transferred and incorporated into a surface of an over-formed organic solid crystal thin film.

The deposition surface of a substrate or mold may include a functional layer that is configured to be transferred to the organic solid crystal after formation of the organic solid crystal and its separation from the substrate or mold. Functional layers may include an interference coating, an AR coating, a reflectivity enhancing coating, a bandpass coating, a band-block coating, blanket or patterned electrodes, etc. By way of example, an electrode may include any suitably electrically conductive material such as a metal, a transparent conductive oxide (TCO) (e.g., indium tin oxide or indium gallium zinc oxide), or a metal mesh or nanowire matrix (e.g., including metal nanowires or carbon nanotubes).

In some embodiments, the non-volatile medium material may be disposed between the mold surface and the organic precursor and may be adapted to decrease the surface roughness of the molded organic article and promote its release from the mold while locally inhibiting nucleation of a crystalline phase. Example non-volatile medium materials include liquids such as a silicone oil, a fluorinated polymer, a polyolefin and/or polyethylene glycol. Further example non-volatile medium materials may include crystalline materials having a melting temperature that is less than the melting temperature of the organic precursor material. In some embodiments the mold surface may be pre-treated in order to improve wetting and/or adhesion of the non-volatile medium material.

Further example deposition methods for forming organic solid crystals include vapor phase growth, solid state growth, melt-based growth, solution growth, etc., optionally in conjunction with a suitable substrate. A substrate may be organic or inorganic. According to some embodiments, solid-, liquid-, or gas-phase deposition processes may include epitaxial processes.

As used herein, the terms "epitaxy," "epitaxial" and/or "epitaxial growth and/or deposition" refer to the nucleation and growth of an organic solid crystal on a deposition surface where the organic solid crystal layer being grown assumes the same crystalline habit as the material of the deposition surface. For example, in an epitaxial deposition process, chemical reactants may be controlled, and the system parameters may be set so that depositing atoms or molecules alight on the deposition surface and remain sufficiently mobile via surface diffusion to orient themselves according to the crystalline orientation of the atoms or molecules of the deposition surface. An epitaxial process may be homogeneous or heterogeneous.

Further example coating processes, e.g., from solution or a melt, may include 3D printing, ink jet printing, gravure printing, doctor blading, spin coating, and the like. Such processes may induce shear during the act of coating and accordingly contribute to crystallite or molecular alignment and a preferred orientation of crystallites and/or molecules within an organic solid crystal thin film or fiber.

In accordance with various embodiments, the optical and electrooptic properties of an organic solid crystal may be tuned using doping and related techniques. Doping may influence the polarizability of an organic solid crystal, for example. The introduction of dopants, i.e., impurities, into an organic solid crystal, may influence, for example, the highest occupied molecular orbital (HOMO) and lowest unoccupied molecular orbital (LUMO) bands and hence the band gap thereof, induced dipole moment, and/or molecular/crystal polarizability. Doping may be performed in situ, i.e., during epitaxial growth, or following epitaxial growth, for example, using ion implantation or plasma doping. In exemplary embodiments, doping may be used to modify the electronic structure of an organic solid crystal without damaging molecular packing or the crystal structure itself. A post-implantation annealing step may be used to heal crystal defects introduced during ion implantation. Annealing may include rapid thermal annealing or pulsed annealing, for example.

Doping changes the electron and hole carrier concentrations of a host material at thermal equilibrium. A doped organic solid crystal may be p-type or n-type. As used herein, "p-type" refers to the addition of impurities to an organic solid crystal that creates a deficiency of valence electrons, whereas "n-type" refers to the addition of impurities that contribute free electrons to an organic solid crystal. Without wishing to be bound by theory, doping may influence "π-stacking" and "π-π interactions" within an organic solid crystal.

Example dopants include Lewis acids (electron acceptors) and Lewis bases (electron donors). Particular examples include charge-neutral and ionic species, e.g., Brønsted acids and Brønsted bases, which in addition to the aforementioned processes may be incorporated into an organic solid crystal by solution growth or co-deposition in the vapor phase. In particular embodiments, a dopant may include an organic molecule, an organic ion, an inorganic molecule, or an inorganic ion. A doping profile may be homogeneous or localized to a particular region (e.g., depth) of an organic solid crystal.

Disclosed are organic solid crystals having an actively tunable refractive index and birefringence. Methods of manufacturing such organic solid crystals may enable control of their surface roughness independent of surface features (e.g., gratings) and may include the formation of an organic article therefrom. A variable and controllable refractive index architecture may be incorporated into and enable various optic and photonic devices and systems.

According to various embodiments, an organic article including an organic solid crystal (OSC) may be integrated into an optical element or device, such as an OFET, OPV, OLED, etc., and may be incorporated into an optical element such as a waveguide, Fresnel lens (e.g., a cylindrical Fresnel lens or a spherical Fresnel lens), grating, photonic integrated circuit, birefringent compensation layer, reflective polarizer, index matching layer (LED/OLED), holographic data storage element, and the like.

As used herein, a grating is an optical element having a periodic structure that is configured to disperse or diffract light into plural component beams. The direction or diffraction angles of the diffracted light may depend on the wavelength of the light incident on the grating, the orientation of the incident light with respect to a grating surface, and the spacing between adjacent diffracting elements. In certain embodiments, grating architectures may be tunable along one, two, or three dimensions. Optical elements may include a single layer or a multilayer OSC architecture.

As will be appreciated, one or more characteristics of organic solid crystals may be specifically tailored for a particular application. For many optical applications, for instance, it may be advantageous to control crystallite size, surface roughness, mechanical strength and toughness, and the orientation of crystallites and/or molecules within an organic solid crystal thin film or fiber.

The active modulation of refractive index may improve the performance of photonic systems and devices, including passive and active optical waveguides, resonators, lasers, optical modulators, etc. Further example active optics include projectors and projection optics, ophthalmic high index lenses, eye-tracking, gradient-index optics, Pancharatnam-Berry phase (PBP) lenses, pupil steering elements, microlenses, optical computing, fiber optics, rewritable optical data storage, all-optical logic gates, multi-wavelength optical data processing, optical transistors, etc.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-20, detailed descriptions of organic solid crystals, their methods of manufacture, and potential applications. The discussion associated with FIG. 1 relates to example mold-based processes for forming an organic solid crystal thin film. The discussion associated with FIG. 2 relates to the structure and properties of example organic solid crystals. The discussion associated with FIGS. 3-5 includes a description of example epitaxial growth processes for forming organic solid crystals. The discussion associated with FIGS. 6-9 includes a description of further epitaxial and non-epitaxial growth processes for forming organic solid crystals. The discussion associated with FIGS. 10-13 includes a description of 1D and 2D structured organic solid crystals. The discussion associated with FIG. 14 includes a description of a mechanism for the active tuning of refractive index in an organic solid crystal material. The discussion associated with FIGS. 15-17 includes a description of example organic solid crystal-containing optical elements. The discussion associated with FIG. 18 includes a description of computational data demonstrating the effects of charge injection and strain on the refractive index of an organic solid crystal. The discussion associated with FIGS. 19 and 20 relates to exemplary virtual reality and augmented reality devices that may include one or more organic solid crystal thin films or fibers as disclosed herein.

Turning to FIG. 1, shown schematically are example manufacturing architectures that may be implemented in accordance with certain methods of forming an organic solid crystal thin film. In some embodiments, a layer of a crystallizable organic precursor may be deposited between mold surfaces or over a surface of a substrate and processed to form an organic solid crystal thin film. The crystallizable organic precursor may include one or more crystallizable organic molecules.

Referring to FIG. 1A, shown at an intermediate stage of fabrication, the organic precursor layer 110 may be disposed between upper and lower mold bodies 120, which may be respectively coated with upper and lower layers of a non-volatile medium material 130. The non-volatile medium material layers 130 may include an anti-nucleation layer. Following processing to induce nucleation and growth of the organic solid crystal, the resulting organic solid crystal thin film 112 may be removed from the mold 120. Exemplary processing steps may include zone annealing. The organic solid thin film 112 may be birefringent (e.g., $n_1 \neq n_2 \neq n_3$) and may be characterized by a high refractive index (e.g., $n_2 > 1.4$ and/or $n_3 > 1.4$).

Referring to FIG. 1B, shown is a further manufacturing architecture for forming a supported organic solid crystal thin film. In the architecture of FIG. 1B, at an intermediate stage of fabrication, a crystallizable organic precursor layer 110 may be disposed over a substrate 140. An upper mold body 120 may overlie the organic precursor layer 110, and a non-volatile medium material layer 130 may be located between the mold 120 and the organic precursor layer 110. The layer of non-volatile medium material 130 may directly overlie the organic precursor layer 110 and may be configured to control the surface roughness of an upper surface of the organic solid crystal thin film 112 during crystal growth. In accordance with some embodiments, in FIG. 1A and FIG. 1B, a direction of movement of a crystallization front 111 during crystal growth is denoted with an arrow A.

Figure 2:
FIG. 2 shows cross-polarized microscope images of an organic solid crystal manufactured (A) without a non-volatile medium material and (B) with a non-volatile medium material according to some embodiments.
Figure 2:
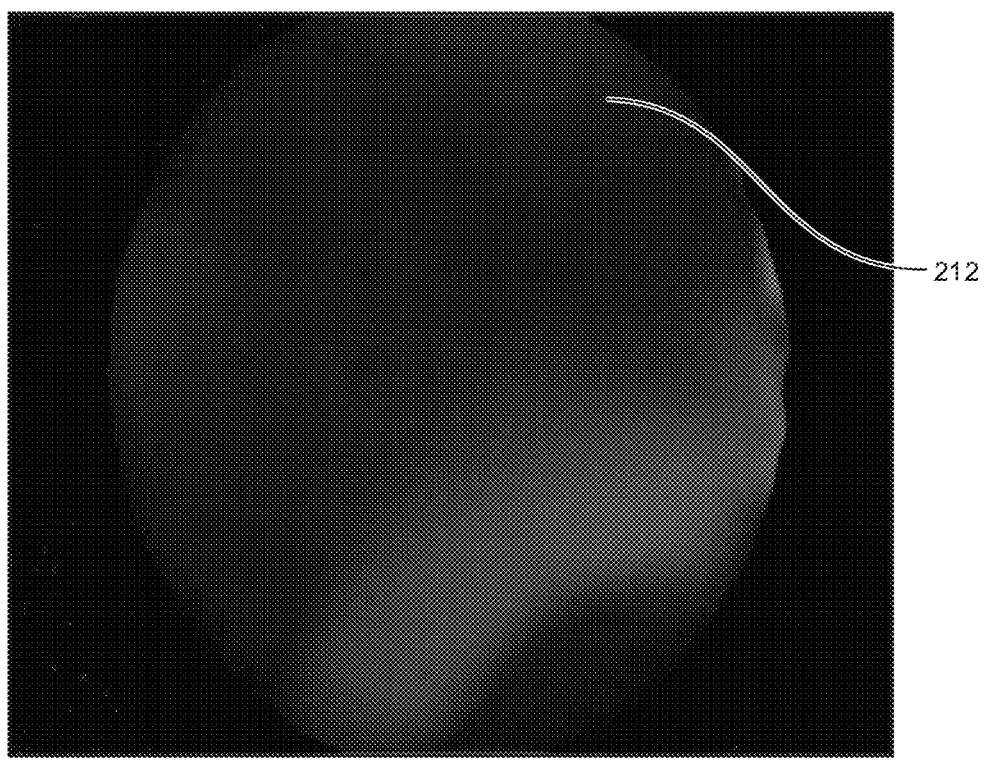

Referring to FIG. 2, shown are polarized optical microscope images of organic solid crystal thin films formed using a mold-based method. The thin films 211, 212 were manufactured (A) without using a layer of non-volatile medium material, and (B) with a layer of non-volatile medium material pre-disposed over a surface of the mold (for example, using a method illustrated in FIG. 1A or FIG. 1B). The improved surface morphology associated with use of the non-volatile medium material layer is evident in the appearance of organic solid thin film 212 in FIG. 2B.

Figure 3:
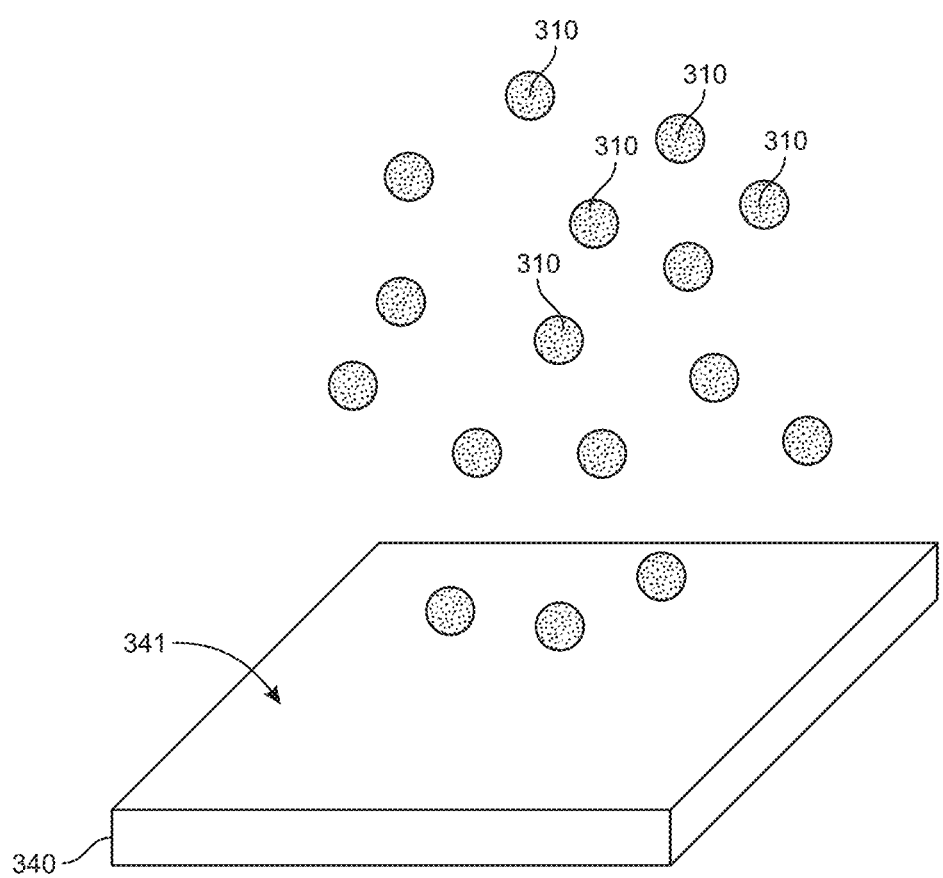
FIG. 3 is a schematic representation of a vapor deposition-based epitaxial growth process for forming organic solid crystals according to some embodiments.

An example vapor phase epitaxial growth process for forming an organic solid crystal thin film is illustrated schematically in FIG. 3. Vaporized molecules 310 of an organic solid crystal material may be directed, e.g., within a vacuum chamber (not shown), to a deposition surface 341 of a substrate 340 to form a layer of an organic solid crystal over the substrate. The choice of solvent, concentration of the vaporized molecules, substrate temperature, temperature gradient(s), gas pressure, etc. may be used to control the gas phase mobility of the molecules 310, the adsorption and desorption rates of the molecules 310, and the crystallization rate and crystal structure of the organic solid crystal thin film.

Figure 4:
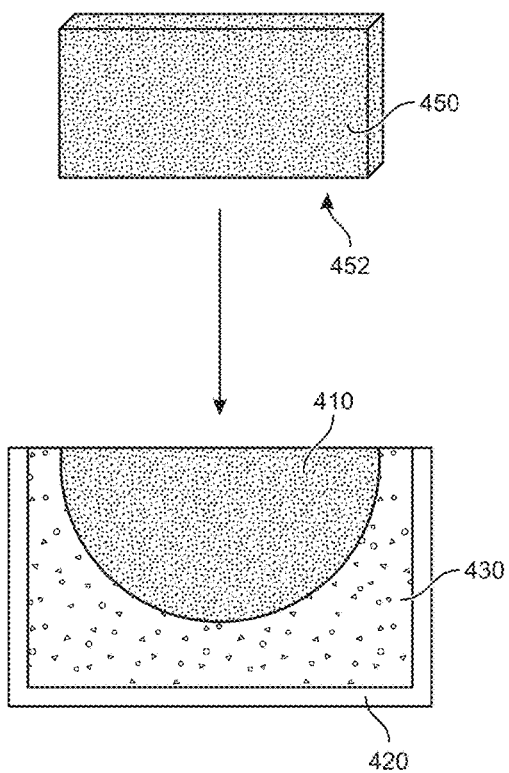
FIG. 4 is a schematic representation of a melt-based epitaxial growth process for forming organic solid crystals according to some embodiments.

A further example epitaxial growth process for forming an organic solid crystal is illustrated schematically in FIG. 4. In the method of FIG. 4, an organic crystal melt 410 may be contained and heated within a crucible 420. The crucible 420 may be formed from a glass or glass ceramic material, for example. The organic crystal melt 410 may be directly in contact with a non-volatile medium material 430 contained by the crucible 420. The non-volatile medium material 430 may include silicone oil, paraffin oil, a fluorinated polymer or fluorinated oligomer, polyethylene glycol, polyolefin, and the like.

A seed crystal 450 may be contacted with the organic crystal melt 410 and drawn from the melt phase at a desired rate, e.g., under continuous operation, to form an organic solid crystal. The seed crystal 450 may include an organic solid crystal material. In some embodiments, the composition of the organic crystal melt 410 and the composition of the seed crystal 450 may be equivalent or substantially equivalent. The seed crystal 450 may have a planar or non-planar contact surface 452 that contacts the melt phase, which may be chosen to control the shape (e.g., curvature) of an over-formed organic solid crystal. In some embodiments, crucible 420 may be configured as a mold and the organic crystal melt 410 may crystallize within crucible 420 to form an organic solid crystal.

Figure 5:
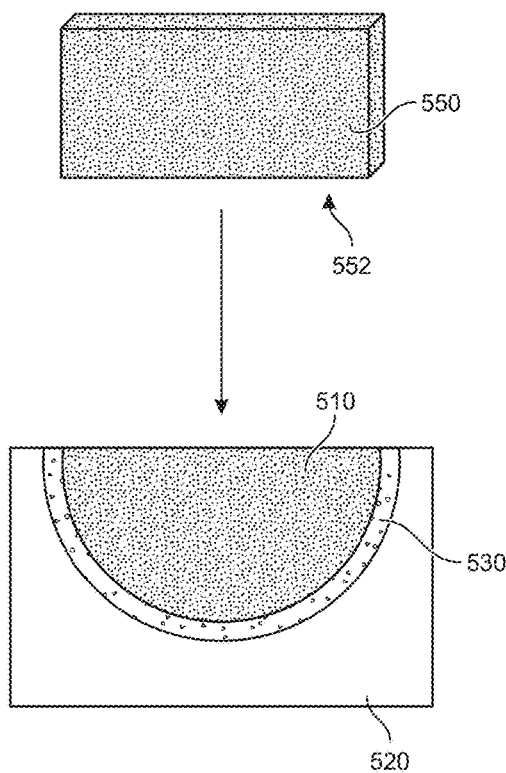
FIG. 5 is a schematic representation of a melt-based epitaxial growth process for forming organic solid crystals according to further embodiments.

A still further example epitaxial growth process and process architecture for forming an organic solid crystal is illustrated schematically in FIG. 5. In the method of FIG. 5, an organic crystal melt 510 may be contained and heated within a crucible 520. The crucible 520 may be configured to provide mechanical support and may include, for example, a glass or glass ceramic material. The organic crystal melt 510 may be directly in contact with a layer of a non-volatile medium material 530 overlying an inner surface of the crucible 520. The non-volatile medium material 530 may include silicone oil, paraffin oil, a fluorinated polymer or fluorinated oligomer, polyethylene glycol, polyolefin, and the like. In the illustrated embodiment, the non-volatile medium material layer 530 may include a conformal layer of free-standing molecules (e.g., an oil or a brushed layer of a polymer, oligomer, or small molecules such as silane or a fluorinated polymer).

Seed crystal 550 may be contacted with the organic crystal melt 510 and drawn from the melt phase at a desired rate, e.g., under continuous operation, to form an organic solid crystal. The seed crystal 550 may include an organic solid crystal material. In some embodiments, the organic crystal melt 510 and the seed crystal 550 may be compositionally equivalent or substantially equivalent. In some embodiments, the seed crystal 550 may have a planar or non-planar contact surface 552, which may be chosen to control the shape (e.g., curvature) of an over-formed organic solid crystal. In some embodiments, crucible 520 may be configured as a mold, and the organic crystal melt 510 may crystallize within crucible 520 to form an organic solid crystal.

In the embodiments of FIG. 4 and FIG. 5, the atmosphere overlying the melt phase may be controlled. For instance, the atmosphere overlying the melt may contain an inert gas such as argon that is maintained under a controlled pressure and/or flow rate.

Figure 6:
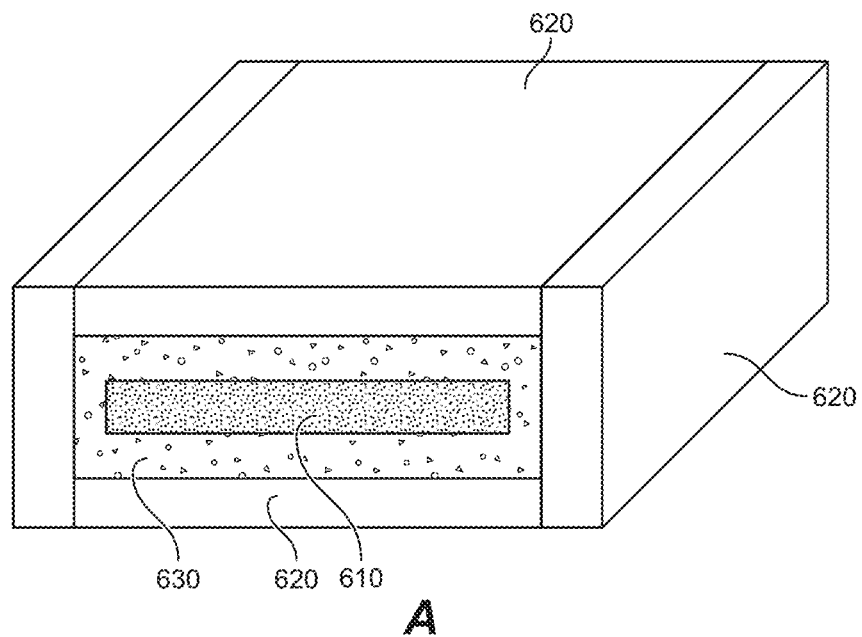
FIG. 6 shows (A) double-sided mold and (B) single-sided mold epitaxial growth processes for forming organic solid crystals according to further embodiments.
Figure 6:
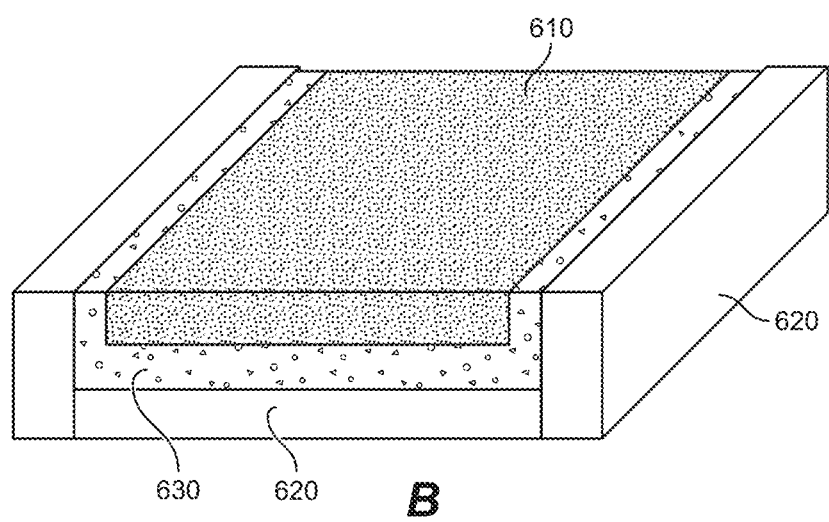
Figure 7:
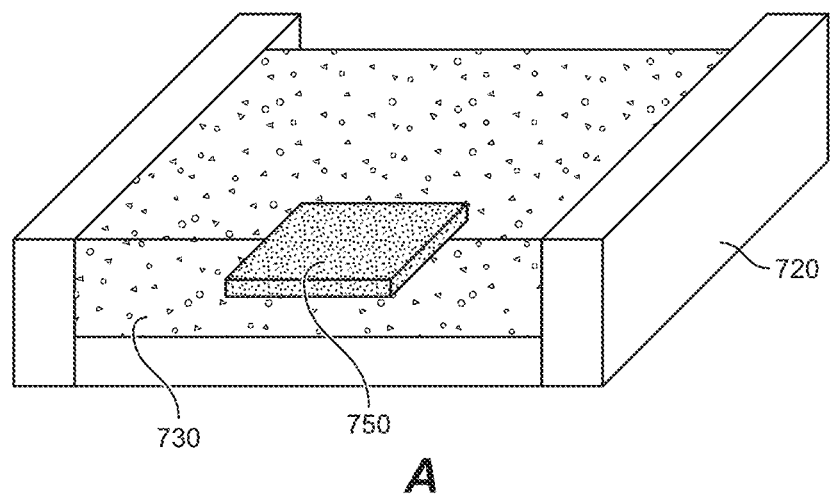
FIG. 7 shows a seeded single-sided mold epitaxial growth process for forming organic solid crystals according to some embodiments.
Figure 7:
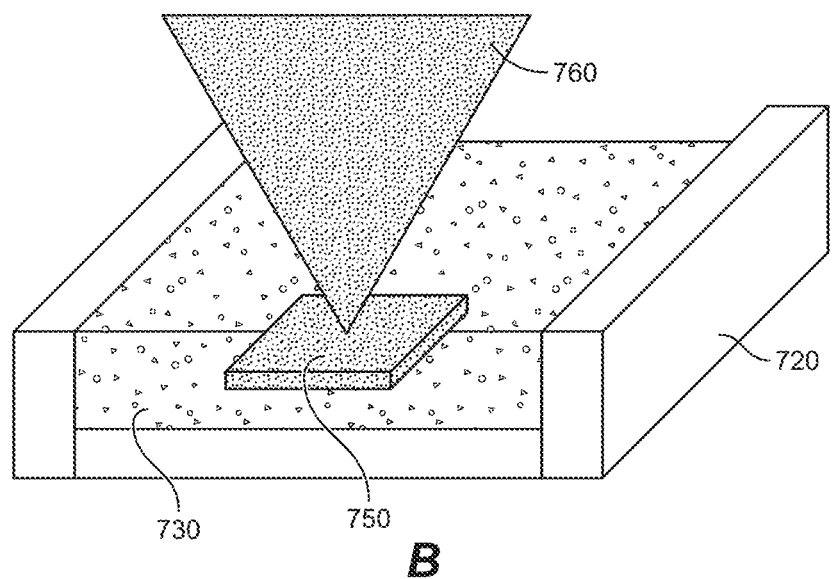

According to further embodiments, an example molding process architecture for forming an organic solid crystal is shown in FIG. 6, where both (A) a double-sided mold, and (B) a single-sided mold architecture are illustrated. In each approach, a layer of a non-volatile medium material (i.e., anti-nucleation layer) 630 may be disposed between a mold 620 and a melt phase 610. A localized seed layer (not shown) may be used to initiate crystal nucleation and growth. A cut-away illustration of the single-sided mold approach of FIG. 6B is shown in FIG. 7. In FIG. 7A, shown is a seed crystal 750 located within mold 720 and in contact with an anti-nucleation layer 730. Referring to FIG. 7B, a dispensing element 760 may be configured to deliver organic crystal molecules to a nucleation site proximate to the seed crystal 750, and subsequently to a crystallization front during crystal growth.

Figure 8:
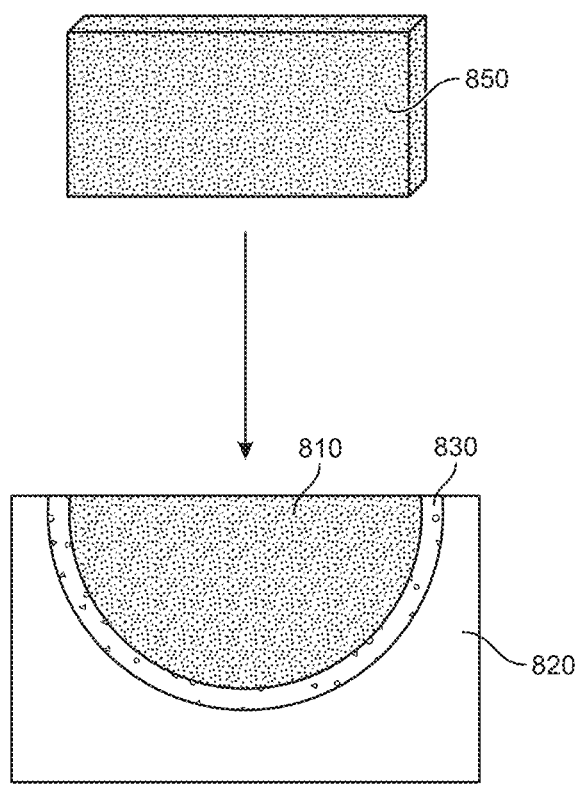
FIG. 8 is a schematic illustration of a solvent-based epitaxial/non-epitaxial growth process for forming organic solid crystals according to some embodiments.

Referring to FIG. 8, shown is a schematic set-up for an epitaxial or non-epitaxial growth process where an organic crystal seed 850 may be brought into contact with, and drawn from, a super saturated organic solution 810. The organic solution may include one or more crystallizable organic molecules dissolved in a suitable solvent. The organic solution 810 may be contained within crucible 820 and separated from the crucible 820 by an anti-nucleation layer 830.

Figure 9:
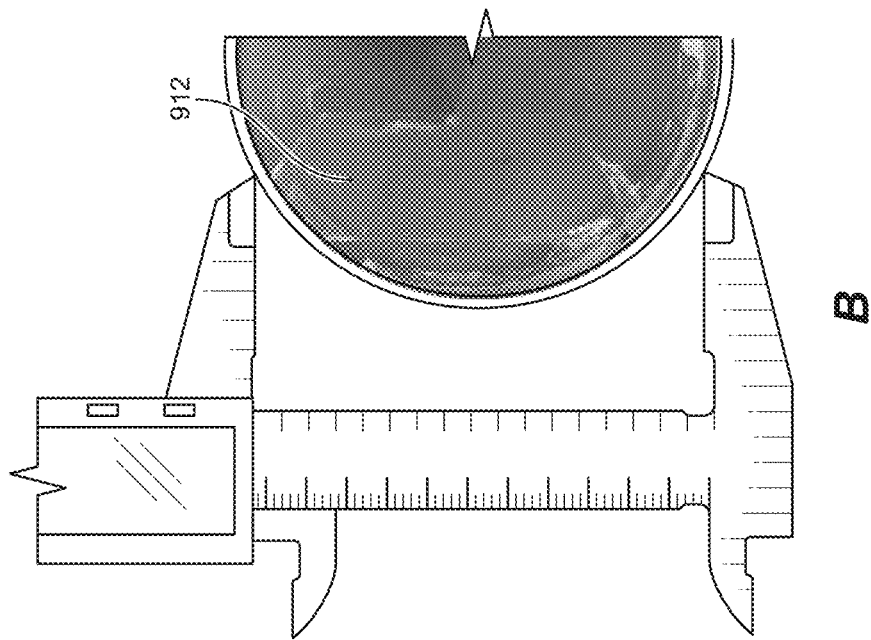
FIG. 9 is a schematic illustration of a non-epitaxial growth process for forming organic solid crystals according to certain embodiments.
Figure 9:
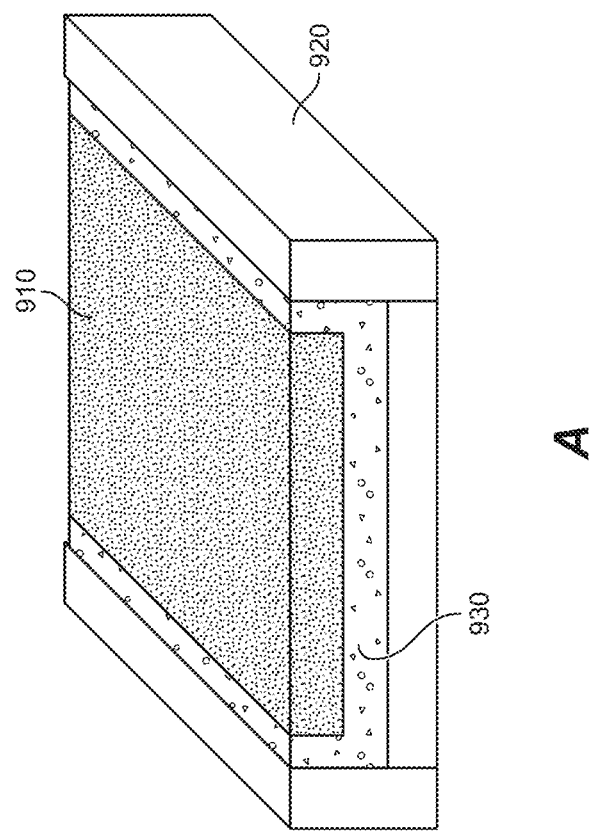

Referring to FIG. 9, a further nucleation and growth process may include providing an anti-nucleation layer 930 over a substrate 920 and introducing an organic crystal solution 910 over the anti-nucleation layer 930. As shown in FIG. 9A, optionally in the absence of a seed layer, the organic crystal solution 910 may solidify to form an organic solid crystal. A photomicrograph of a free-standing organic solid crystal 912 is shown in FIG. 9B. According to some embodiments, the organic solid crystal 912 may be characterized by a length dimension of at least approximately 1 cm.

Figure 10:
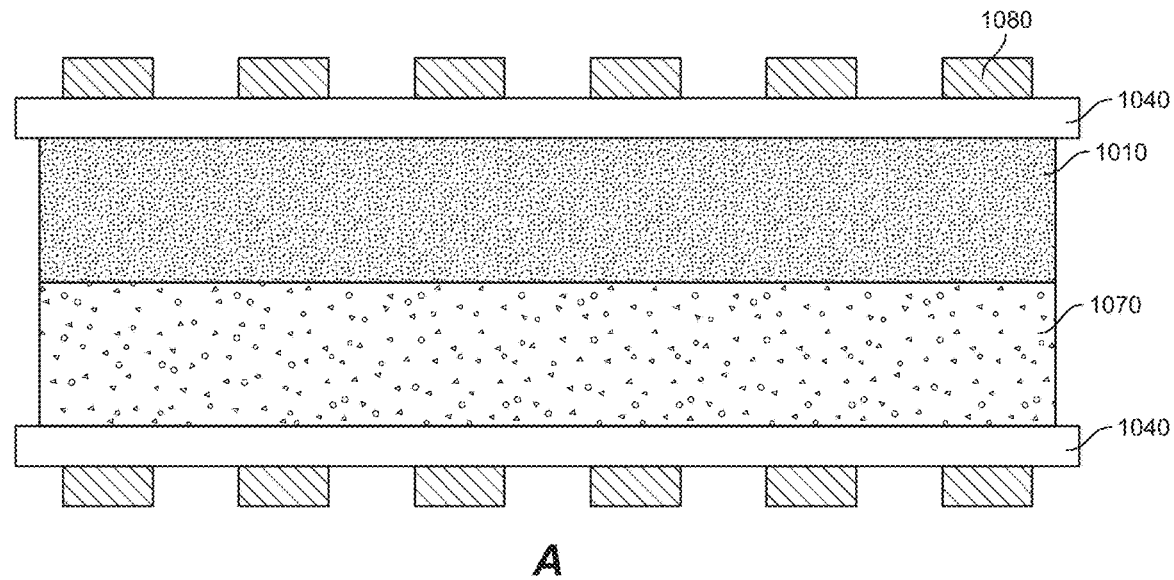
FIG. 10 illustrates an example organic solid crystal-containing grating architecture according to some embodiments.
Figure 10:
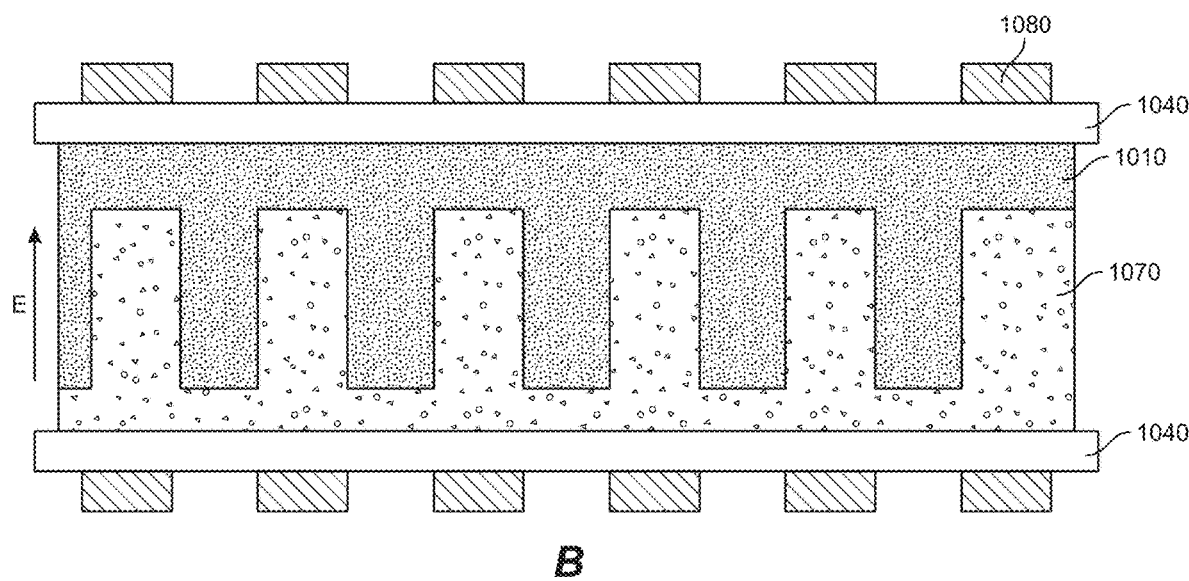
Figure 11:
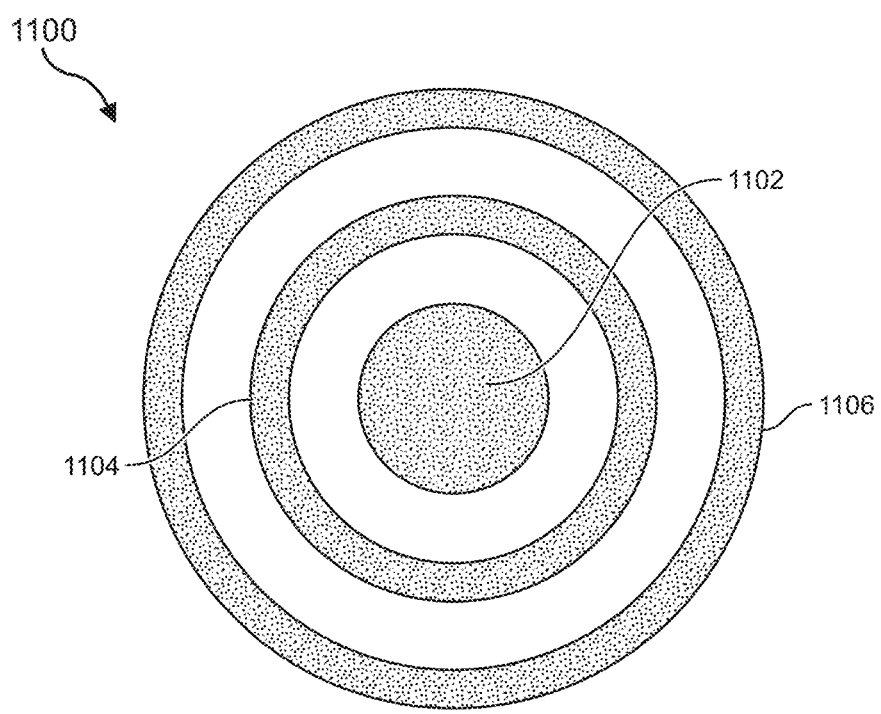
FIG. 11 illustrates an example tripolar concentric ring electrode (CRE) according to certain embodiments.

According to further embodiments, dynamic and static methods for forming an organic solid crystal having structured surface features are shown schematically in FIGS. 10 and 11. Referring initially to FIG. 10A, a layer of an organic crystal solution or melt 1010 and an adjacent layer of an electrically conductive liquid 1070 may be disposed between opposing substrates 1040. Patterned and paired electrodes 1080 may overlie the respective substrates 1040. Referring to FIG. 10B, under an applied electric field (E), a pattern may be induced in the electrically conductive liquid layer 1070, which may create a reciprocal pattern in the organic crystal material layer 1010. In turn, crystallization of the organic crystal material layer 1010 may be carried out by thermally-induced nucleation and growth, for example, optionally in conjunction with a seed crystal (not shown) to form an organic solid crystal thin film having periodic surface features or structures, such as an array of raised elements.

FIG. 11 illustrates an example structure of a tripolar concentric ring electrode (CRE) 1100, such as electrodes 1080. The CRE 1100 may include multiple electrode segments, such as a central disc 1102, an inner ring 1104, and an outer ring 1106. The electrodes may include metals such as aluminum, gold, silver, tin, copper, indium, gallium, zinc, and the like. Other conductive materials may be used, including carbon nanotubes, graphene, transparent conductive oxides (TCOs, e.g., indium tin oxide (ITO), indium gallium zinc oxide (IGZO), zinc oxide (ZnO), etc.), and the like.

The electrodes may be fabricated using any suitable process. For example, the electrodes may be fabricated using physical vapor deposition (PVD), chemical vapor deposition (CVD), evaporation, spray-coating, spin-coating, atomic layer deposition (ALD), and the like. In further aspects, the electrodes may be manufactured using a thermal evaporator, a sputtering system, a spray coater, a spin-coater, printing, stamping, etc.

The electrodes may have a thickness of approximately 1 nm to approximately 1000 nm, with an example thickness of approximately 10 nm to approximately 50 nm. The electrodes in certain embodiments may have an optical transmissivity of at least approximately 50%, e.g., approximately 50%, approximately 60%, approximately 70%, approximately 80%, approximately 90%, approximately 95%, approximately 97%, approximately 98%, or approximately 99%, including ranges between any of the foregoing values.

Figure 12:
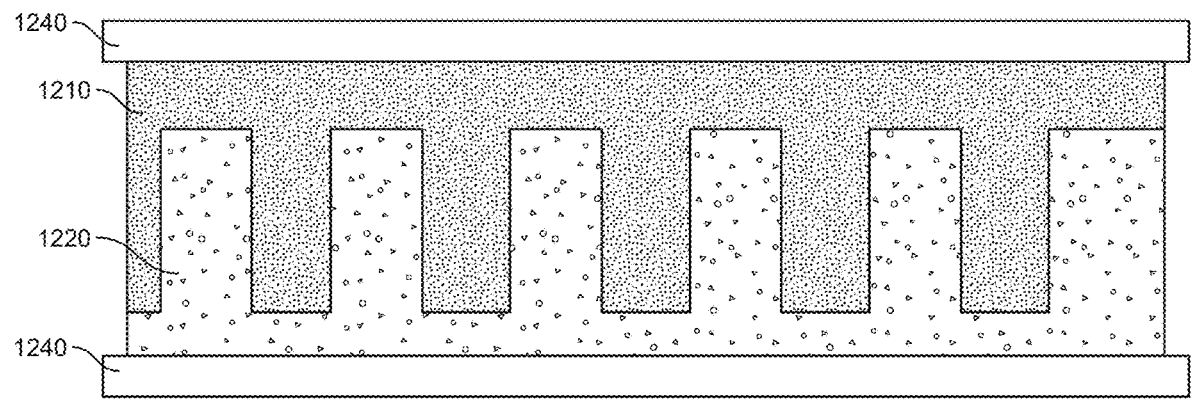
FIG. 12 illustrates an example organic solid crystal-containing grating architecture according to further embodiments.

Referring to FIG. 12, shown is a static approach to forming an organic solid crystal having structured surface features. A layer of an organic crystal solution or melt 1210 and an adjacent pre-patterned mold 1220 may be disposed between opposing substrates 1240. With the organic crystal solution or melt 1210 conforming to the shape of the patterned mold 1220, crystallization of the organic crystal material layer 1210 may be carried out by thermally-induced nucleation and growth to form an organic solid crystal thin film having periodic surface features.

Such structured organic solid crystal thin films may form or be incorporated into a variety of optical elements, including gratings, micro lenses, prismatic lenses, Fresnel lenses, and the like.

Figure 13:
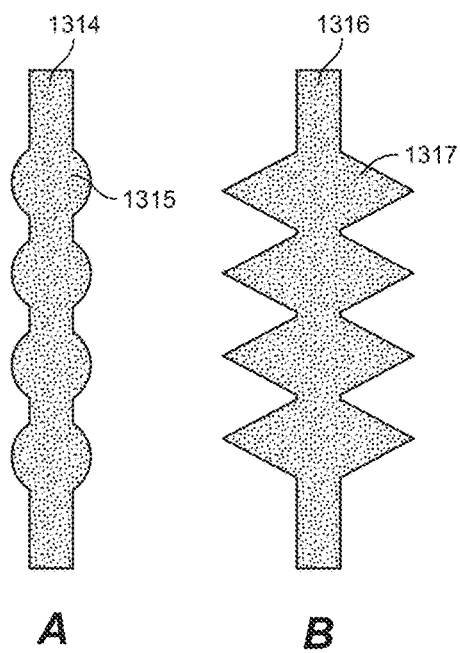
FIG. 13 illustrates example organic solid crystal geometries according to some embodiments.
Figure 14:
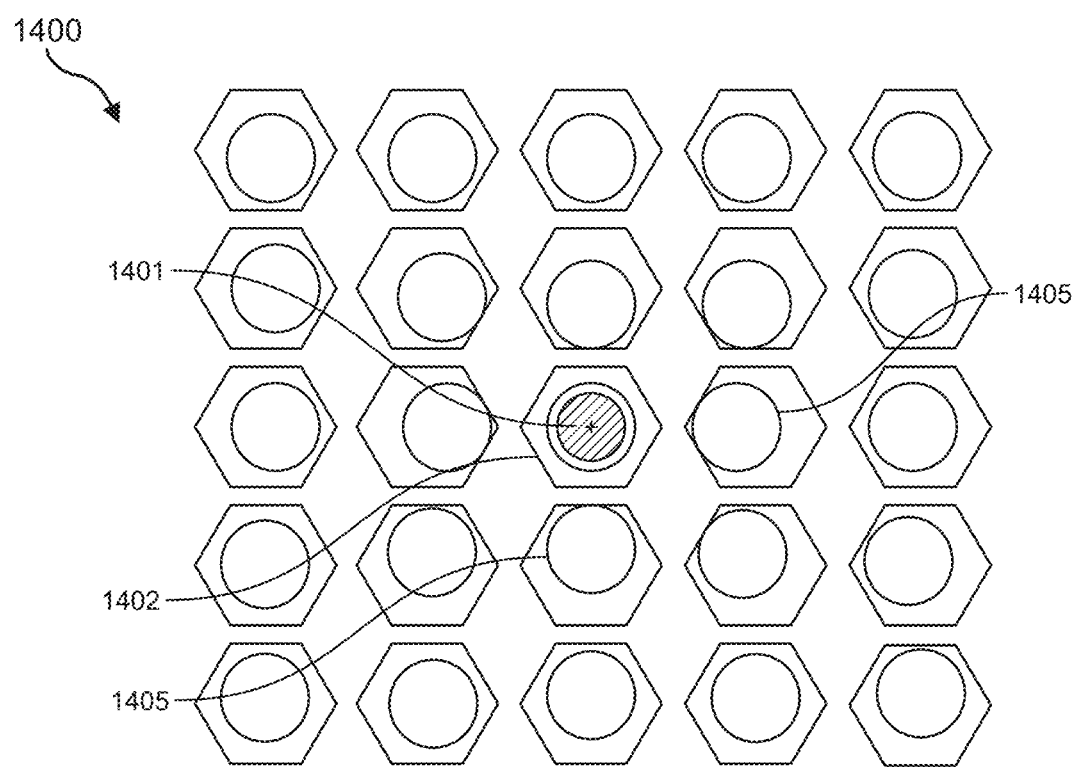
FIG. 14 illustrates an example mechanism for the active tuning of refractive index in a biased organic solid crystal according to some embodiments.

According to further embodiments, a schematic view of example organic solid crystal structures formed by drawing from a melt phase are shown in FIG. 13. The organic solid crystal 1314 depicted in FIG. 13A and the organic solid crystal 1316 depicted in FIG. 13B may include respective surface features, such as nodules 1315 or facets 1317, for example. One or more process variables, including draw rate from the melt, pressure, and temperature may be controlled to create a desired surface pattern.

Without wishing to be bound by theory, a source of active refractive index modulation in organic solid crystals may be derived from a change in polarizability of molecules that contain charge due to hole or electron injection. In organic molecules, the time it takes for a molecule to repolarize upon charge injection may be an order of magnitude faster than the residence time of the charge. Thus, as depicted schematically in FIG. 14, within an organic solid crystal material 1400 the charge 1401 may be on a molecule 1402 long enough for the molecule to modulate its electron cloud as well as the electron cloud 1405 of neighboring molecules. This change in the local electronics of the crystal may result in changes to the polarizability and the refractive index.

Figure 15:
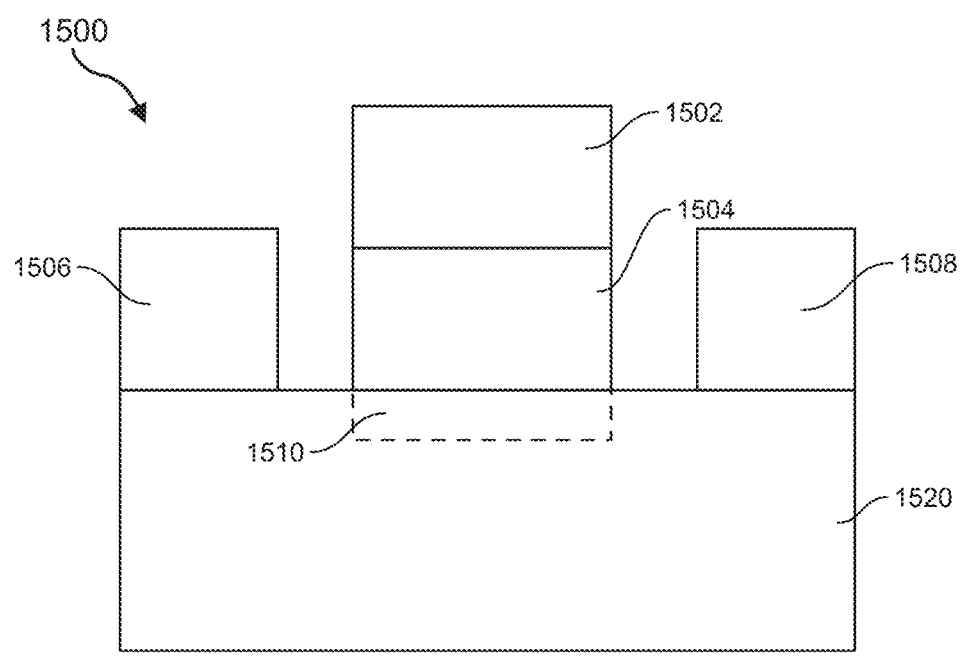
FIG. 15 shows the integration of an optically isotropic or anisotropic organic solid crystal thin film into an example optical element according to various embodiments.

Referring to FIG. 15, an example optical element 1500 has a top gate-top contact (TGTC) architecture and includes a patterned gate 1502 disposed over an insulator layer 1504 and between source 1506 and drain 1508 contacts. The insulator layer 1504 may include any suitable dielectric material, including organic compounds (e.g., polymers) and inorganic compounds (e.g., silicon dioxide). The gate 1502 is disposed over an optically isotropic or anisotropic organic solid crystal (OSC) layer 1510. The gate 1502, source 1506, and drain 1508 are supported by a substrate 1520.

During operation, charge injection into the optically isotropic or anisotropic organic solid crystal (OSC) layer 1510 may be made through source (S) and drain (D) contacts. The illustrated optical element may form an active grating where the voltage applied to the gate and/or to the source and drain may be used to locally control the geometry (e.g., depth and orientation) of a portion of the OSC layer underlying the gate and therefore impact its interaction with light. According to further embodiments, the optical element of FIG. 15 may be applicable to photonic data storage.

According to some embodiments, the optical element of FIG. 15 may optionally include a charge transport layer (not shown) located between the source and the OSC layer and/or between the drain and the OSC layer. A charge transport layer may include an organic compound (e.g., carbon nanotubes) or an inorganic compound. In further example embodiments, an optical element may include a waveguide.

Figure 16:
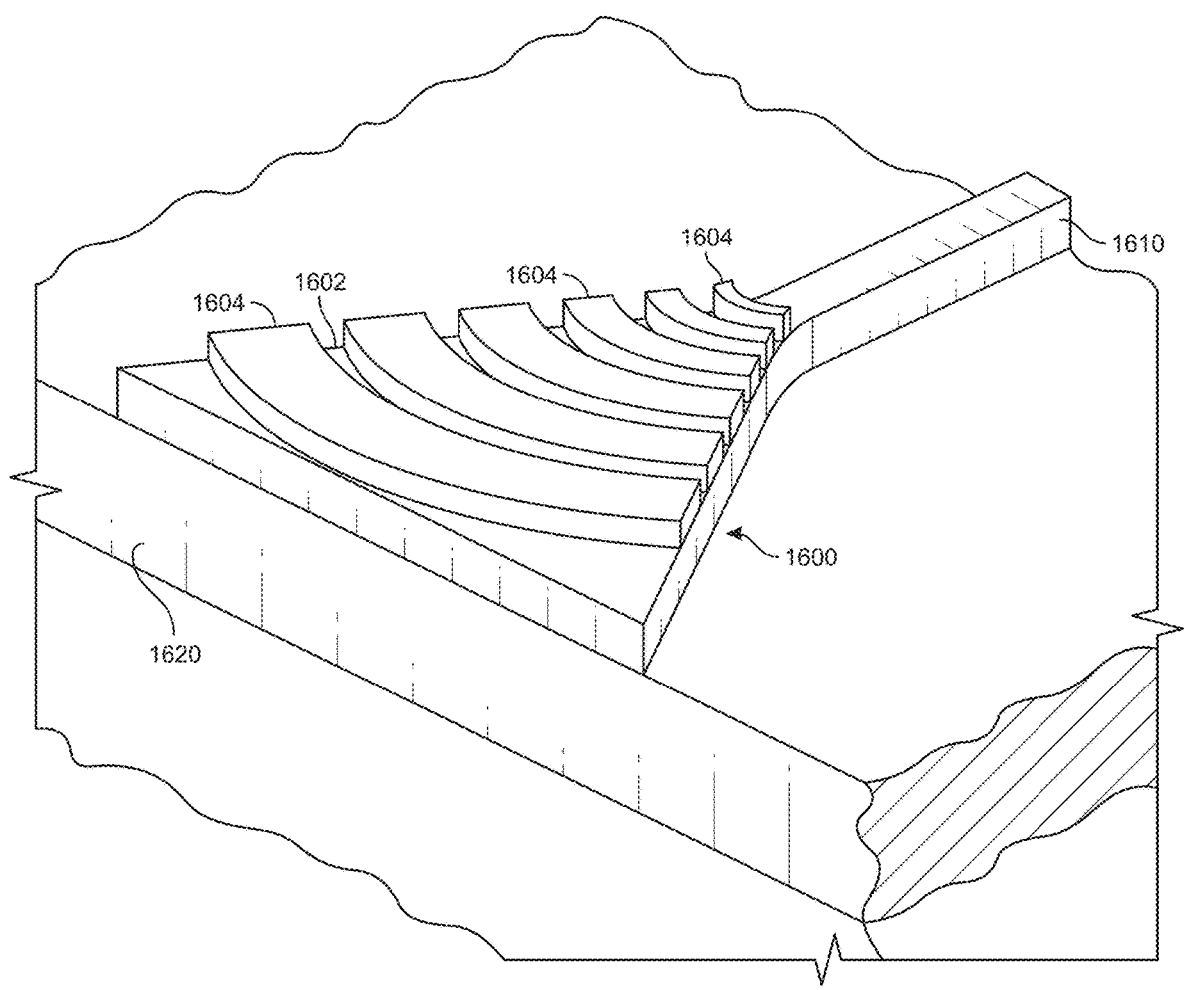
FIG. 16 shows the integration of an organic solid crystal thin film into an optical diffraction grating according to some embodiments.

Referring to FIG. 16, a waveguide structure 1600 may be disposed over a substrate 1620. In certain examples, the substrate 1620 may be configured as a lower cladding layer. As illustrated, the waveguide structure 1600 may include an input photonic element such as a channel waveguide 1610 and a coupling component 1602 in optical communication with the channel waveguide 1610. Coupling component 1602 may include an array of organic solid crystal (OSC) grating elements 1604. During operation, the channel waveguide 1610 may be configured to couple an input beam to the coupling component 1602, and an electric field may be applied to the OSC grating elements 1604 in a manner effective to couple an output beam from the coupling element 1602 into an output photonic element such as an optical fiber (not shown). In certain examples, an upper cladding layer may be formed over waveguide structure 1600.

Figure 17:
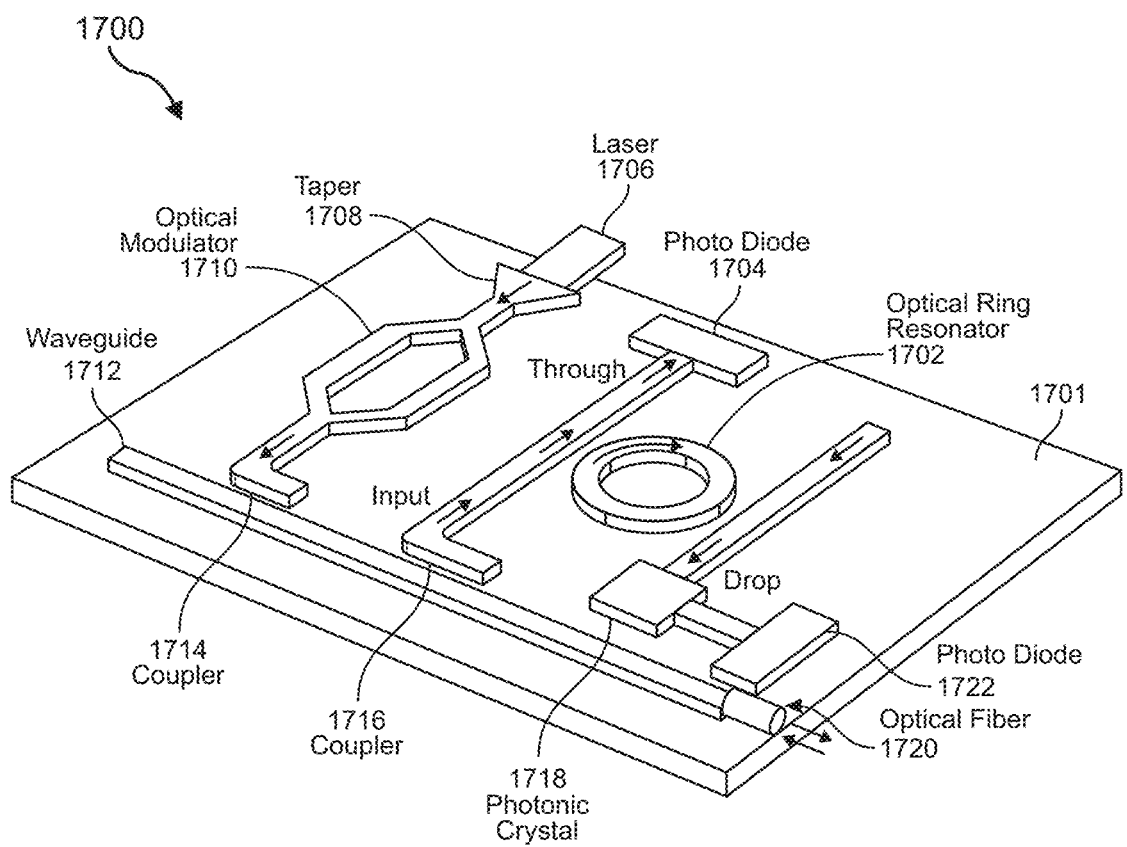
FIG. 17 is an illustration of exemplary photonic components capable of being implemented using optically anisotropic organic materials according to certain embodiments.

Referring FIG. 17, a photonic integrated circuit (PIC) 1700 may include various optical elements, including an optical ring resonator 1702, a photodiode 1704, a laser 1706, a taper 1708, an optical modulator 1710, a waveguide 1712, a coupler 1714, a coupler 1716, a photonic crystal 1718, optical fiber 1720, and/or a photodiode 1722. As illustrated, photonic integrated circuit 1700 may include an organic solid crystal substrate 1701, and one or more of the aforementioned components may include an organic solid crystal.

By way of example, the configuration of a micro ring resonator may include a ring element 1702 coupled to two adjacent linear optical waveguides. Resonance may occur when the optical path length of the resonator is equal to a whole number of wavelengths. One or more electrodes (not shown) may be positioned over or proximate to the ring element 1702 such that the light path may be changed by changing the voltage applied to the electrode(s). Coupling of light into the ring element 1702 may be turned off or on such that input light may be directed through the linear waveguide, e.g., to photodiode 1704, or dropped to photonic crystal 1718 via the ring element 1702.

According to example embodiments, one or more PIC optical elements may be formed from an OSC substrate using subtractive processing, such as photolithography and etching, to remove undesired portions of the substrate 1701 to produce raised features, including ring element 1702 and waveguide 1712, for example, that are integral with the substrate 1701.

Figure 18:
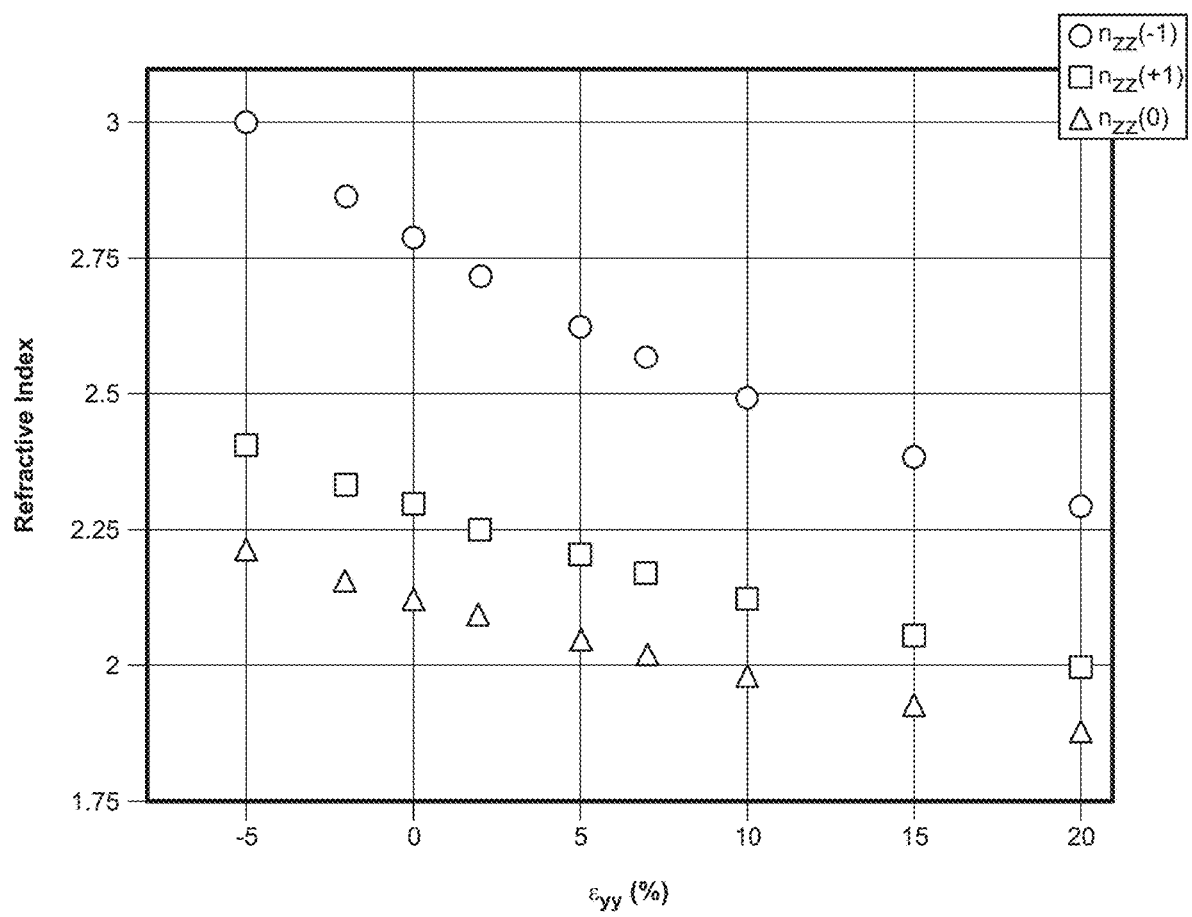
FIG. 18 is a plot showing the effects of charge injection and strain on the refractive index of an organic solid crystal according to certain embodiments.

Referring to FIG. 18, shown are computational data illustrating the effects of strain and charge injection on the refractive index of an organic solid crystal. FIG. 18 is a plot of through-thickness refractive index ($n_{zz}$) versus transverse strain ($\varepsilon_{yy}$) for various degrees of excess charge for an anisotropic anthracene single crystal. For each example, the refractive index decreases with increasing strain, but for a given degree of deformation increases relative to no excess charge (0) in response to the injection of excess holes (+1) or excess electrons (−1).

As disclosed herein, a photonic integrated circuit (PIC) may be co-integrated with an organic thin film that provides active modulation of refractive index. The organic thin film may include solid or liquid materials, for example, including organic semiconductors, where through the application of an electric current and/or voltage, a directionally specific change in refractive index ($\Delta n$) may be realized without a significant increase in optical absorption at working wavelengths. The change in refractive index ($\Delta n$) may range from approximately 0.005 to approximately 0.5, for example.

By way of example, active modulation of the refractive index within an OSC-containing photonic integrated circuit may enable beam steering/splitting and light modulation in a comparatively economical design. Moreover, charge injection into the disclosed organic materials may create a relatively large birefringence between one pair of material axes and an otherwise relatively small birefringence between the remaining axis pairs. For instance, an in-plane birefringence $\Delta n(xy)$ may be greater than approximately 0.1, whereas $\Delta n(xz)$ and $\Delta n(yz)$ may each be on the order of approximately 0.001. Example organic materials include small molecules, macromolecules, liquid crystals, organometallic compounds, oligomers, and polymers.

Particular organic semiconductors may include polycyclic aromatic compounds, such as anthracene and phenanthrene. Such materials may be incorporated into various architectures, including transistors, diodes, capacitors, and the like. Optical elements may include single or multilayer stacks of one or more organic materials. Active index modulation may beneficially improve the performance of PIC architectures, such as in passive and active optical waveguides, resonators, lasers, optical modulators, etc. Example active index PIC applications may include tunable lasers and optical data processors.

Example processes may be integrated with a real-time feedback loop that is configured to assess one or more attributes of the organic solid crystal thin film or fiber and accordingly adjust one or more process variables. Resultant organic solid crystal structures may be incorporated into optical elements such as AR/VR headsets and other devices, e.g., waveguides, prisms, Fresnel lenses, and the like.

EXAMPLE EMBODIMENTS

Example 1: A photonic integrated circuit includes an organic solid crystal (OSC) material layer, the OSC material layer having a substrate portion and a raised optical element integral with and extending from the substrate portion.

Example 2: The photonic integrated circuit of Example 1, where the OSC material layer includes a hydrocarbon compound selected from naphthalene, anthracene, phenanthrene, pyrene, corannulene, fluorene, and biphenyl.

Example 3: The photonic integrated circuit of any of Examples 1 and 2, where the OSC material layer includes a hydrocarbon compound selected from furan, pyrrole, thiophene, pyridine, pyrimidine, piperidine, triazenes, thiazole, oxazoles, and oxathioles.

Example 4: The photonic integrated circuit of any of Examples 1-3, where the OSC material layer includes a dopant selected from fluorine, chlorine, nitrogen, oxygen, sulfur, selenium, tellurium, phosphorus, silver, copper, potassium, sodium, and ambipolar organic semiconductors.

Example 5: The photonic integrated circuit of any of Examples 1-4, where the OSC material layer includes at least one of a uniaxially-oriented index of refraction or a biaxially-oriented index of refraction.

Example 6: The photonic integrated circuit of any of Examples 1-5, where the OSC material layer has a refractive index of at least approximately 1.6 and a birefringence of at least approximately 0.1.

Example 7: The photonic integrated circuit of any of Examples 1-6, where the OSC material layer is a single crystal.

Example 8: The photonic integrated circuit of any of Examples 1-7, where the raised optical element is configured to transmit electromagnetic radiation.

Example 9: The photonic integrated circuit of any of Examples 1-8, where the raised optical element includes a passive component selected from a waveguide, a crossing structure, a taper, a directional coupler, a beam splitter, and a grating.

Example 10: The photonic integrated circuit of any of Examples 1-8, where the raised optical element includes an active component selected from an optical modulator, an optical switch or gate, and a phase shifter.

Example 11: The photonic integrated circuit of any of Examples 1-10, further including an electrode disposed over at least a portion of the raised optical element.

Example 12: A head-mounted display including the photonic integrated circuit of any of Examples 1-11.

Example 13: A device includes an organic solid crystal (OSC) substrate and an optical element disposed over the substrate, where the optical element includes an organic solid crystal layer.

Example 14: The device of Example 13, where the optical element is integral with the substrate.

Example 15: The device of any of Examples 13 and 14, where the optical element has a refractive index of at least approximately 1.6 and a birefringence of at least approximately 0.01.

Example 16: The device of any of Examples 13-15, where the optical element includes a single crystal.

Example 17: The device of any of Examples 13-16, where the optical element is configured to transmit electromagnetic radiation.

Example 18: The device of any of Examples 13-17, further including an electrode disposed over at least a portion of the optical element.

Example 19: A method includes forming a primary electrode, forming an organic solid crystal (OSC) layer over the primary electrode, removing a selected portion of the OSC layer opposite to the primary electrode to form an optical element from an unremoved portion of the OSC layer, forming a secondary electrode over at least a portion of the optical element, applying a first voltage between the primary electrode and the secondary electrode to create a first refractive index within the optical element along a chosen direction, and applying a second voltage between the primary electrode and the secondary electrode to create a second refractive index within the optical element along the chosen direction.

Example 20: The method of Example 19, where the optical element has a first birefringence when the first voltage is applied and a second birefringence when the second voltage is applied.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1900 in FIG. 19) or that visually immerses a user in an artificial reality (e.g., virtual-reality system 2000 in FIG. 20). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 19:
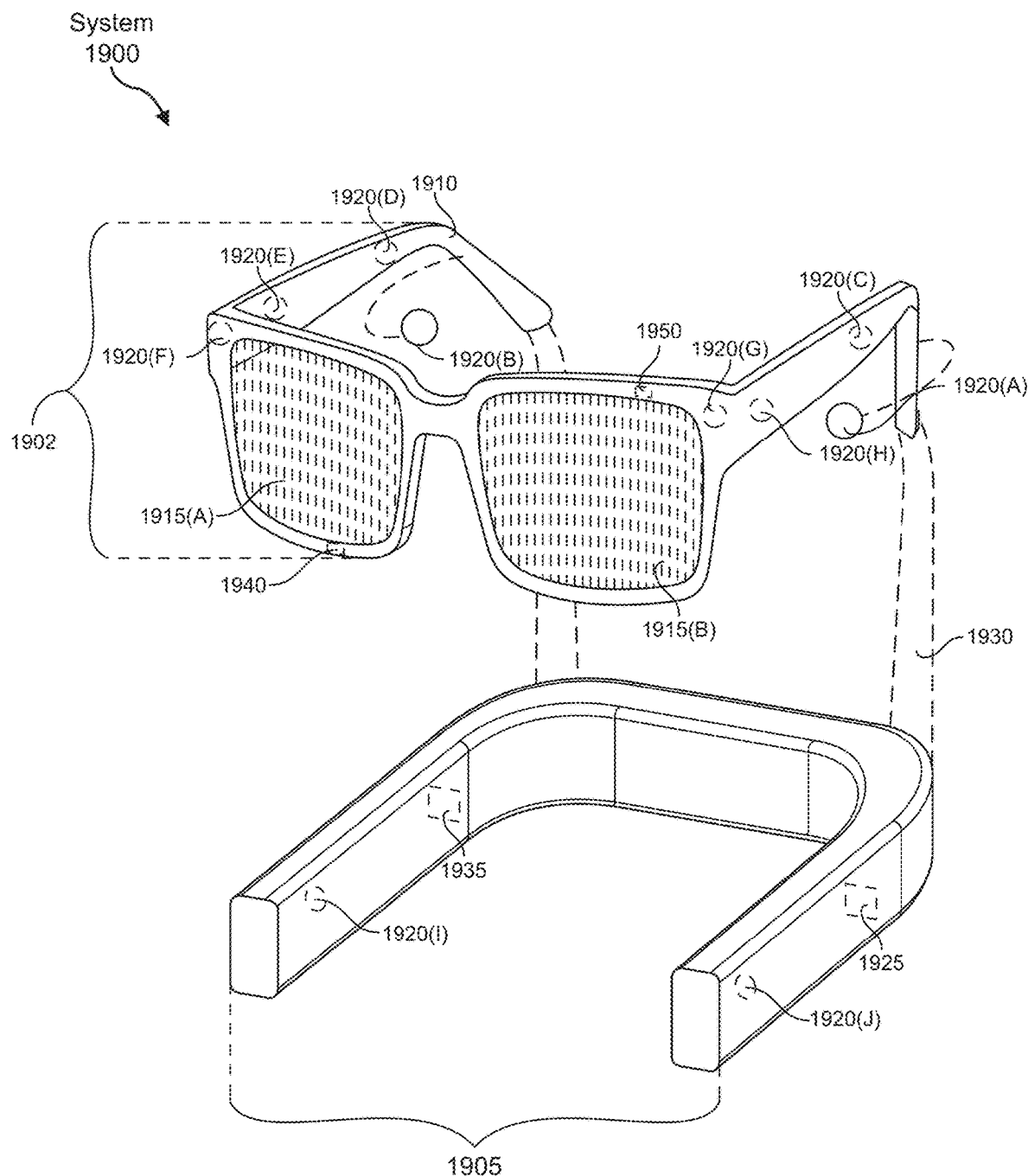
FIG. 19 is an illustration of exemplary augmented-reality glasses that may be used in connection with embodiments of this disclosure.

Turning to FIG. 19, augmented-reality system 1900 may include an eyewear device 1902 with a frame 1910 configured to hold a left display device 1915(A) and a right display device 1915(B) in front of a user's eyes. Display devices 1915(A) and 1915(B) may act together or independently to present an image or series of images to a user. While augmented-reality system 1900 includes two displays, embodiments of this disclosure may be implemented in augmented-reality systems with a single NED or more than two NEDs.

In some embodiments, augmented-reality system 1900 may include one or more sensors, such as sensor 1940. Sensor 1940 may generate measurement signals in response to motion of augmented-reality system 1900 and may be located on substantially any portion of frame 1910. Sensor 1940 may represent a position sensor, an inertial measurement unit (IMU), a depth camera assembly, a structured light emitter and/or detector, or any combination thereof. In some embodiments, augmented-reality system 1900 may or may not include sensor 1940 or may include more than one sensor. In embodiments in which sensor 1940 includes an IMU, the IMU may generate calibration data based on measurement signals from sensor 1940. Examples of sensor 1940 may include, without limitation, accelerometers, gyroscopes, magnetometers, other suitable types of sensors that detect motion, sensors used for error correction of the IMU, or some combination thereof.

Augmented-reality system 1900 may also include a microphone array with a plurality of acoustic transducers 1920(A)-1920(J), referred to collectively as acoustic transducers 1920. Acoustic transducers 1920 may be transducers that detect air pressure variations induced by sound waves. Each acoustic transducer 1920 may be configured to detect sound and convert the detected sound into an electronic format (e.g., an analog or digital format). The microphone array in FIG. 19 may include, for example, ten acoustic transducers: 1920(A) and 1920(B), which may be designed to be placed inside a corresponding ear of the user, acoustic transducers 1920(C), 1920(D), 1920(E), 1920(F), 1920(G), and 1920(H), which may be positioned at various locations on frame 1910, and/or acoustic transducers 1920(I) and 1920(J), which may be positioned on a corresponding neckband 1905.

In some embodiments, one or more of acoustic transducers 1920(A)-(F) may be used as output transducers (e.g., speakers). For example, acoustic transducers 1920(A) and/or 1920(B) may be earbuds or any other suitable type of headphone or speaker.

The configuration of acoustic transducers 1920 of the microphone array may vary. While augmented-reality system 1900 is shown in FIG. 19 as having ten acoustic transducers 1920, the number of acoustic transducers 1920 may be greater or less than ten. In some embodiments, using higher numbers of acoustic transducers 1920 may increase the amount of audio information collected and/or the sensitivity and accuracy of the audio information. In contrast, using a lower number of acoustic transducers 1920 may decrease the computing power required by an associated controller 1950 to process the collected audio information. In addition, the position of each acoustic transducer 1920 of the microphone array may vary. For example, the position of an acoustic transducer 1920 may include a defined position on the user, a defined coordinate on frame 1910, an orientation associated with each acoustic transducer 1920, or some combination thereof.

Acoustic transducers 1920(A) and 1920(B) may be positioned on different parts of the user's ear, such as behind the pinna, behind the tragus, and/or within the auricle or fossa. Or, there may be additional acoustic transducers 1920 on or surrounding the ear in addition to acoustic transducers 1920 inside the ear canal. Having an acoustic transducer 1920 positioned next to an ear canal of a user may enable the microphone array to collect information on how sounds arrive at the ear canal. By positioning at least two of acoustic transducers 1920 on either side of a user's head (e.g., as binaural microphones), augmented-reality device 1900 may simulate binaural hearing and capture a 3D stereo sound field around about a user's head. In some embodiments, acoustic transducers 1920(A) and 1920(B) may be connected to augmented-reality system 1900 via a wired connection 1930, and in other embodiments acoustic transducers 1920(A) and 1920(B) may be connected to augmented-reality system 1900 via a wireless connection (e.g., a Bluetooth connection). In still other embodiments, acoustic transducers 1920(A) and 1920(B) may not be used at all in conjunction with augmented-reality system 1900.

Acoustic transducers 1920 on frame 1910 may be positioned along the length of the temples, across the bridge, above or below display devices 1915(A) and 1915(B), or some combination thereof. Acoustic transducers 1920 may be oriented such that the microphone array is able to detect sounds in a wide range of directions surrounding the user wearing the augmented-reality system 1900. In some embodiments, an optimization process may be performed during manufacturing of augmented-reality system 1900 to determine relative positioning of each acoustic transducer 1920 in the microphone array.

In some examples, augmented-reality system 1900 may include or be connected to an external device (e.g., a paired device), such as neckband 1905. Neckband 1905 generally represents any type or form of paired device. Thus, the following discussion of neckband 1905 may also apply to various other paired devices, such as charging cases, smart watches, smart phones, wrist bands, other wearable devices, hand-held controllers, tablet computers, laptop computers, other external compute devices, etc.

As shown, neckband 1905 may be coupled to eyewear device 1902 via one or more connectors. The connectors may be wired or wireless and may include electrical and/or non-electrical (e.g., structural) components. In some cases, eyewear device 1902 and neckband 1905 may operate independently without any wired or wireless connection between them. While FIG. 19 illustrates the components of eyewear device 1902 and neckband 1905 in example locations on eyewear device 1902 and neckband 1905, the components may be located elsewhere and/or distributed differently on eyewear device 1902 and/or neckband 1905. In some embodiments, the components of eyewear device 1902 and neckband 1905 may be located on one or more additional peripheral devices paired with eyewear device 1902, neckband 1905, or some combination thereof.

Pairing external devices, such as neckband 1905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1900 may be provided by a paired device or shared between a paired device and an eyewear device, thus reducing the weight, heat profile, and form factor of the eyewear device overall while still retaining desired functionality. For example, neckband 1905 may allow components that would otherwise be included on an eyewear device to be included in neckband 1905 since users may tolerate a heavier weight load on their shoulders than they would tolerate on their heads. Neckband 1905 may also have a larger surface area over which to diffuse and disperse heat to the ambient environment. Thus, neckband 1905 may allow for greater battery and computation capacity than might otherwise have been possible on a stand-alone eyewear device. Since weight carried in neckband 1905 may be less invasive to a user than weight carried in eyewear device 1902, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1905 may be communicatively coupled with eyewear device 1902 and/or to other devices. These other devices may provide certain functions (e.g., tracking, localizing, depth mapping, processing, storage, etc.) to augmented-reality system 1900. In the embodiment of FIG. 19, neckband 1905 may include two acoustic transducers (e.g., 1920(I) and 1920(J)) that are part of the microphone array (or potentially form their own microphone subarray). Neckband 1905 may also include a controller 1925 and a power source 1935.

Acoustic transducers 1920(I) and 1920(J) of neckband 1905 may be configured to detect sound and convert the detected sound into an electronic format (analog or digital). In the embodiment of FIG. 19, acoustic transducers 1920(I) and 1920(J) may be positioned on neckband 1905, thereby increasing the distance between the neckband acoustic transducers 1920(I) and 1920(J) and other acoustic transducers 1920 positioned on eyewear device 1902. In some cases, increasing the distance between acoustic transducers 1920 of the microphone array may improve the accuracy of beamforming performed via the microphone array. For example, if a sound is detected by acoustic transducers 1920(C) and 1920(D) and the distance between acoustic transducers 1920(C) and 1920(D) is greater than, e.g., the distance between acoustic transducers 1920(D) and 1920(E), the determined source location of the detected sound may be more accurate than if the sound had been detected by acoustic transducers 1920(D) and 1920(E).

Controller 1925 of neckband 1905 may process information generated by the sensors on neckband 1905 and/or augmented-reality system 1900. For example, controller 1925 may process information from the microphone array that describes sounds detected by the microphone array. For each detected sound, controller 1925 may perform a direction-of-arrival (DOA) estimation to estimate a direction from which the detected sound arrived at the microphone array. As the microphone array detects sounds, controller 1925 may populate an audio data set with the information. In embodiments in which augmented-reality system 1900 includes an inertial measurement unit, controller 1925 may compute all inertial and spatial calculations from the IMU located on eyewear device 1902. A connector may convey information between augmented-reality system 1900 and neckband 1905 and between augmented-reality system 1900 and controller 1925. The information may be in the form of optical data, electrical data, wireless data, or any other transmittable data form. Moving the processing of information generated by augmented-reality system 1900 to neckband 1905 may reduce weight and heat in eyewear device 1902, making it more comfortable to the user.

Power source 1935 in neckband 1905 may provide power to eyewear device 1902 and/or to neckband 1905. Power source 1935 may include, without limitation, lithium ion batteries, lithium-polymer batteries, primary lithium batteries, alkaline batteries, or any other form of power storage. In some cases, power source 1935 may be a wired power source. Including power source 1935 on neckband 1905 instead of on eyewear device 1902 may help better distribute the weight and heat generated by power source 1935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2000 in FIG. 20, that mostly or completely covers a user's field of view. Virtual-reality system 2000 may include a front rigid body 2002 and a band 2004 shaped to fit around a user's head. Virtual-reality system 2000 may also include output audio transducers 2006(A) and 2006(B). Furthermore, while not shown in FIG. 20, front rigid body 2002 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 1900 and/or virtual-reality system 2000 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1900 and/or virtual-reality system 2000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1900 and/or virtual-reality system 2000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 20, output audio transducers 2006(A) and 2006(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 19, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a non-volatile medium material that comprises or includes paraffin oil include embodiments where a non-volatile medium material consists essentially of paraffin oil and embodiments where a non-volatile medium material consists of paraffin oil.

What is claimed is:

1. A photonic integrated circuit comprising:
    an organic solid crystal (OSC) material layer, the OSC material layer comprising a substrate portion and a raised optical element integral with and extending from the substrate portion, wherein the raised optical element is configured to have a pattern reciprocally defined by a patterned electric field applied to an electrically conductive liquid layer adjacent to the OSC material layer.

2. The photonic integrated circuit of claim 1, wherein the OSC material layer comprises a hydrocarbon compound selected from the group consisting of naphthalene, anthracene, phenanthrene, pyrene, corannulene, fluorene, and biphenyl.

3. The photonic integrated circuit of claim 1, wherein the OSC material layer comprises a hydrocarbon compound selected from the group consisting of furan, pyrrole, thiophene, pyridine, pyrimidine, piperidine, triazenes, thiazole, oxazoles, and oxathioles.

4. The photonic integrated circuit of claim 1, wherein the OSC material layer comprises a dopant selected from the group consisting of fluorine, chlorine, nitrogen, oxygen, sulfur, selenium, tellurium, phosphorus, silver, copper, potassium, sodium, and ambipolar organic semiconductors.

5. The photonic integrated circuit of claim 1, wherein the OSC material layer comprises at least one of:
    a uniaxially-oriented index of refraction; or
    a biaxially-oriented index of refraction.

6. The photonic integrated circuit of claim 1, wherein the OSC material layer comprises a refractive index of at least approximately 1.6 and a birefringence of at least approximately 0.1.

7. The photonic integrated circuit of claim 1, wherein the OSC material layer comprises a single crystal.

8. The photonic integrated circuit of claim 1, wherein the raised optical element is configured to transmit electromagnetic radiation.

9. The photonic integrated circuit of claim 1, wherein the raised optical element comprises a passive component selected from the group consisting of a waveguide, a crossing structure, a taper, a directional coupler, a beam splitter, and a grating.

10. The photonic integrated circuit of claim 1, wherein the raised optical element comprises an active component selected from the group consisting of an optical modulator, an optical switch or gate, and a phase shifter.

11. The photonic integrated circuit of claim 1, further comprising an electrode disposed over at least a portion of the raised optical element.

12. A head-mounted display comprising the photonic integrated circuit of claim 1.

13. A device comprising:
   an organic solid crystal (OSC) substrate; and
   an optical element disposed over the substrate, wherein the optical element comprises an organic solid crystal layer and is configured to have a pattern reciprocally defined by a patterned electric field applied to an electrically conductive liquid layer adjacent to the OSC substrate.

14. The device of claim 13, wherein the optical element is integral with the OSC substrate.

15. The device of claim 13, wherein the optical element comprises a refractive index of at least approximately 1.6 and a birefringence of at least approximately 0.01.

16. The device of claim 13, wherein the optical element comprises a single crystal.

17. The device of claim 13, wherein the optical element is configured to transmit electromagnetic radiation.

18. The device of claim 13, further comprising an electrode disposed over at least a portion of the optical element.

* * * * *